US012052507B2

(12) United States Patent
Ota et al.

(10) Patent No.: US 12,052,507 B2
(45) Date of Patent: Jul. 30, 2024

(54) PHOTOELECTRIC CONVERSION DEVICE AND PHOTOELECTRIC CONVERSION SYSTEM WITH EXPANDED DYNAMIC RANGE

(71) Applicant: CANON KABUSHIKI KAISHA, Tokyo (JP)

(72) Inventors: Yasuharu Ota, Tokyo (JP); Kazuhiro Morimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/930,033

(22) Filed: Sep. 6, 2022

(65) Prior Publication Data

US 2023/0071218 A1    Mar. 9, 2023

(30) Foreign Application Priority Data

Sep. 8, 2021 (JP) ................. 2021-145932
Feb. 9, 2022 (JP) ................. 2022-018803
May 20, 2022 (JP) ................. 2022-083065

(51) Int. Cl.
 *H04N 23/73* (2023.01)
 *H04N 23/741* (2023.01)

(52) U.S. Cl.
 CPC .......... *H04N 23/73* (2023.01); *H04N 23/741* (2023.01)

(58) Field of Classification Search
 CPC ...... H04N 23/73; H04N 23/741; H04N 25/53; H04N 25/533; H04N 25/773; H04N 23/959
 See application file for complete search history.

(56) References Cited

U.S. PATENT DOCUMENTS

| 10,012,534 | B2 * | 7/2018 | Andreou ............... G01J 1/44 |
| 11,158,663 | B2 * | 10/2021 | Cao ................ H01L 27/14643 |
| 11,172,147 | B2 * | 11/2021 | Kuroda ............ H01L 31/02027 |
| 2017/0131143 | A1 | 5/2017 | Andreou et al. |
| 2018/0374889 | A1 | 12/2018 | Cao et al. |
| 2020/0244909 | A1 | 7/2020 | Morimoto |
| 2021/0020793 | A1 | 1/2021 | Shinohara |

FOREIGN PATENT DOCUMENTS

WO    2017219223 A1    12/2017

OTHER PUBLICATIONS

Intellectual Property India, Examination report under sections 12 & 13 of the Patents Act for Application No. 202244050565, dated May 4, 2023.

* cited by examiner

*Primary Examiner* — Ahmed A Berhan
(74) *Attorney, Agent, or Firm* — Canon U.S.A., Inc. IP Division

(57) ABSTRACT

A photoelectric conversion device includes a circuit provided between an avalanche photodiode and a power source, a counter configured to count an output signal output from the avalanche photodiode, and a memory into which time information indicating that a count value of the counter has reached a threshold value within a predetermined exposure period shorter than an exposure time is written, wherein a clock signal is configured to be input to the circuit in the exposure period.

27 Claims, 22 Drawing Sheets

PHOTOELECTRIC CONVERSION DEVICE AND PHOTOELECTRIC CONVERSION SYSTEM WITH EXPANDED DYNAMIC RANGE

BACKGROUND OF THE INVENTION

Field of the Invention

The present invention relates to a photoelectric conversion device and a photoelectric conversion system.

Description of the Related Art

There is known a light detection device that uses an avalanche photodiode (APD) capable of detecting extremely weak light of a single-photon level by using an avalanche (electronic avalanche) multiplication effect. The APD forms a high electric field region (avalanche multiplication region) by a first semiconductor region of a first conductivity type having the same polarity as a signal charge and a second semiconductor region of a second conductivity type having a different polarity from that of the signal charge.

United States Patent Application Publication No. 2020/0244909 discusses a light detection device that controls a waiting state in which an APD can perform avalanche multiplication, and a recharge state in which the APD is returned to the waiting state, by using a clock signal having a predetermined frequency. More specifically, the clock signal controls the switching on and off of a switch provided between an APD and a power source that applies a reverse bias to the APD. For example, in a case where the clock signal is at a first level, the switch turns off to bring the APD into the waiting state. Further, in a case where the clock signal is at a second level, the switch turns on to bring the APD into the recharge state. Further, the clock signal is configured to be subjected to a logic operation with an output signal from the APD. Accordingly, in a case where a photon is incident on the APD in the waiting state, an output signal is output to a counter from the APD at a timing at which the clock signal shifts from the first level to the second level.

By using the configuration discussed in United States Patent Application Publication No. 2020/0244909, it is possible to prevent a pile-up phenomenon in which a photon cannot be counted in a case of high illumination intensity. However, with the configuration discussed in United States Patent Application Publication No. 2020/0244909, in a case where the illumination intensity becomes higher than a predetermined illumination intensity, the count value is saturated. Thus, the dynamic range of the light detection device is not expanded sufficiently.

SUMMARY OF THE INVENTION

The present invention is directed to a photoelectric conversion device including an avalanche photodiode (APD) of which a dynamic range can be expanded more than the configuration discussed in United States Patent Application Publication No. 2020/0244909.

According to an aspect of the present invention, a photoelectric conversion device includes a photodiode configured to perform avalanche multiplication, a circuit provided between the photodiode and a power source and configured to switch between a first state in which the photodiode is electrically connected with the power source and a second state in which the photodiode is not electrically connected with the power source, a counter configured to count an output signal output from the photodiode, and a memory into which time information indicating that a count value of the counter has reached a threshold value within a predetermined exposure period included in and shorter than an exposure period is written, wherein a clock signal is configured to be input to the circuit in the exposure period.

Further features of the present invention will become apparent from the following description of exemplary embodiments with reference to the attached drawings.

DESCRIPTION OF THE EMBODIMENTS

Exemplary embodiments described below are intended to embody the technological idea of the present invention, and are not intended to limit the present invention. The sizes and positional relationships of components illustrated in each diagram may sometimes be exaggerated to clarify the descriptions. In the descriptions below, the same numerals are assigned to the same components, and duplicate descriptions thereof may be omitted. Further, a configuration described in each exemplary embodiment can be replaced or combined with a configuration described in another exemplary embodiment as long as there is no technical problem.

Hereinbelow, exemplary embodiments of the present invention will be described with reference to the attached drawings. In addition, in the following descriptions, terms indicating specific directions or positions (e.g., "up", "down", "right", "left", and other terms including them) may be used as needed. These terms are used to make the comprehension of the present invention with reference to the attached drawings easier, and not intended to limit the technical scope of the present invention by the meanings of the terms.

In the following descriptions, the anode of an avalanche photodiode (APD) is set to a fixed potential, and a signal is taken out from the cathode side. Accordingly, a semiconductor region of a first conductive type in which the electric charge with a same polarity as the signal charge is the majority carrier is an N-type semiconductor region, and a semiconductor region of a second conductive type in which the electric charge with a polarity different from the signal charge is the majority carrier is an P-type semiconductor region.

In addition, the cathode of the APD may be set to a fixed potential, and a signal may be taken out from the anode side. In this case, a semiconductor region of a first conductive type in which the electric charge with a same polarity as the signal charge is the majority carrier is a P-type semiconductor region, and a semiconductor region of a second conductive type in which the electric charge with a different polarity from the signal charge is the majority carrier is an N-type semiconductor region. In the following descriptions, a case where one node of an APD is set to a fixed potential will be described, but potentials of both nodes may be varied.

Figure 1:
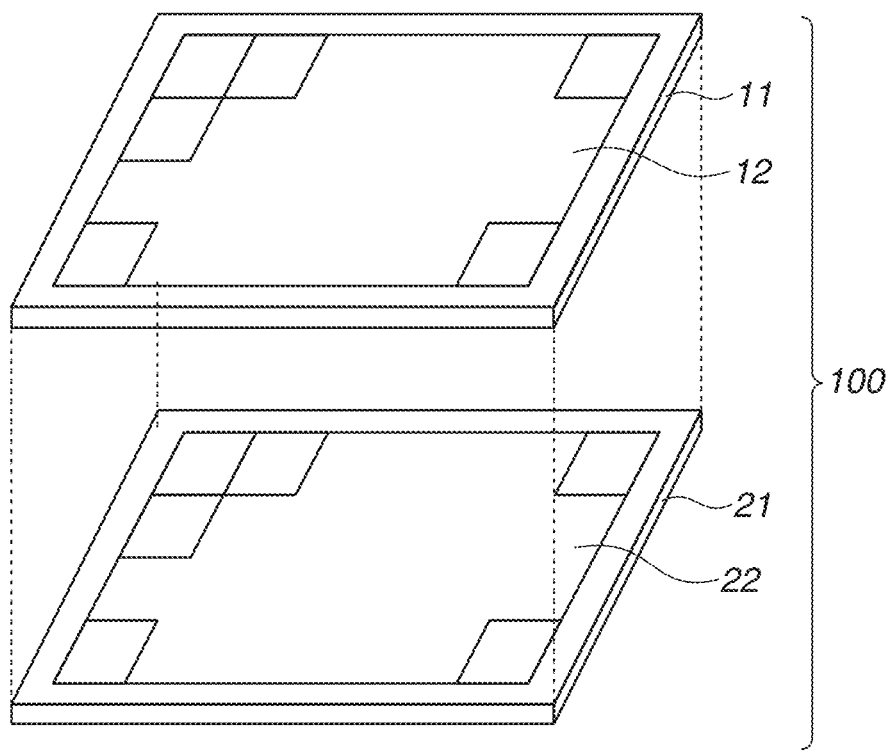
FIG. 1 is a diagram illustrating a configuration of a photoelectric conversion device.

FIG. 1 is a diagram illustrating a configuration of a multi-layer type photoelectric conversion device 100. The photoelectric conversion device 100 is composed of two layered substrates, i.e., a sensor substrate 11 and a circuit substrate 21, which are electrically connected with each other. The sensor substrate 11 includes a first wiring configuration and a first semiconductor layer that includes photoelectric conversion elements 102 to be described below. The circuit substrate 21 includes a second wiring configuration and a second semiconductor layer that includes circuits such as signal processing units 103 to be described below. The photoelectric conversion device 100 is formed by layering the second semiconductor layer, the second wiring configuration, the first wiring configuration, and the first semiconductor layer in this order. The photoelectric conversion device described in each of the exemplary embodiments is a rear surface irradiation type photoelectric conversion device. In the rear surface irradiation type photoelectric conversion device, light is incident from a second surface side, and a circuit substrate is provided on a first surface side.

In the following description, the sensor substrate 11 and the circuit substrate 21 are diced chips. However, they are not limited to the chips. For example, each substrate may be a wafer. Further, each substrate may be diced after being layered in a wafer state, or chips may be layered and jointed after being chipped from a wafer state.

The sensor substrate 11 is provided with a pixel region 12, and the circuit substrate 21 is provided with a circuit region 22 that processes signals detected by the pixel region 12.

Figure 2:
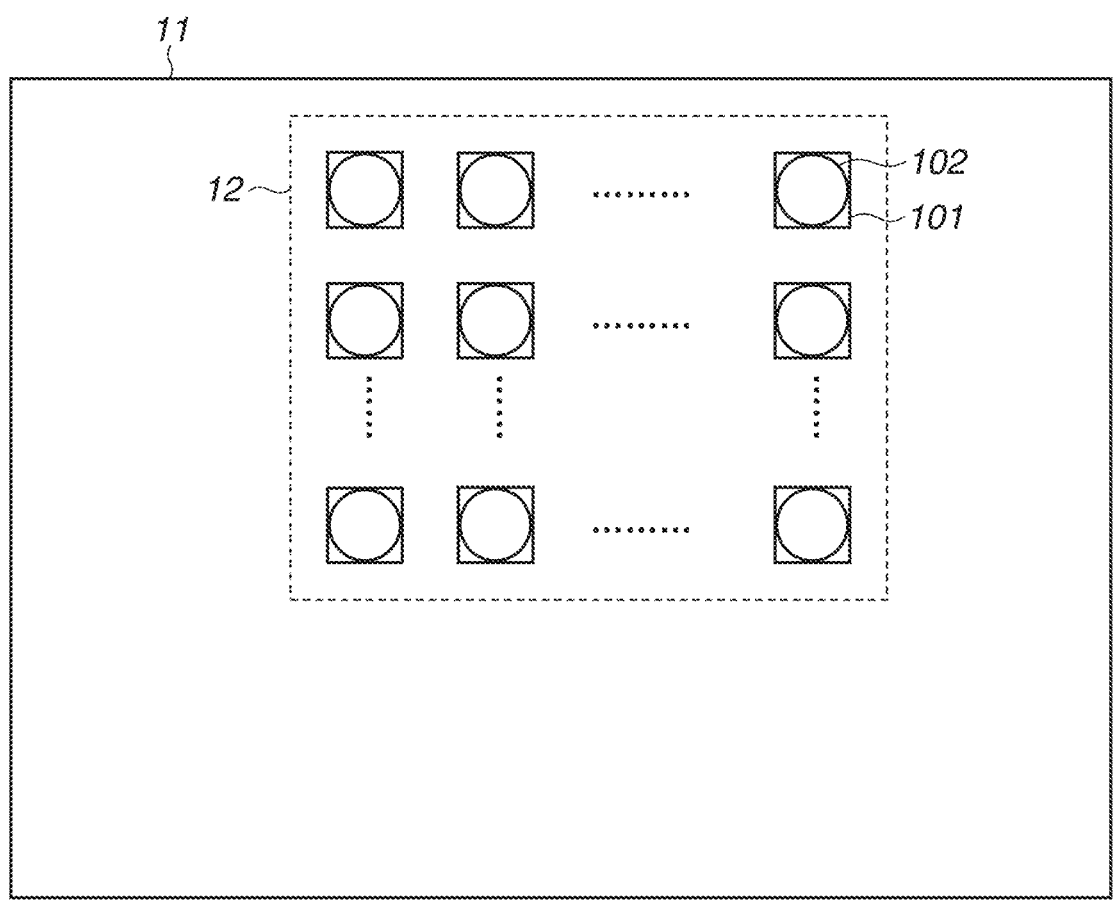
FIG. 2 is a diagram illustrating a layout example of a sensor substrate.

FIG. 2 is a diagram illustrating a layout example of the sensor substrate 11. Pixels 101 each including the photoelectric conversion element 102 including an APD 201 are two-dimensionally arranged in an array in a planar view to form the pixel region 12.

Each of the pixels 101 is typically a pixel to form an image, but in a case where the pixel 101 is used for Time of Flight (TOF), the pixel 101 does not necessarily need to form an image. More specifically, the pixel 101 may be used to measure a time at which light has reached the pixel 101 and the amount of light.

Figure 3:
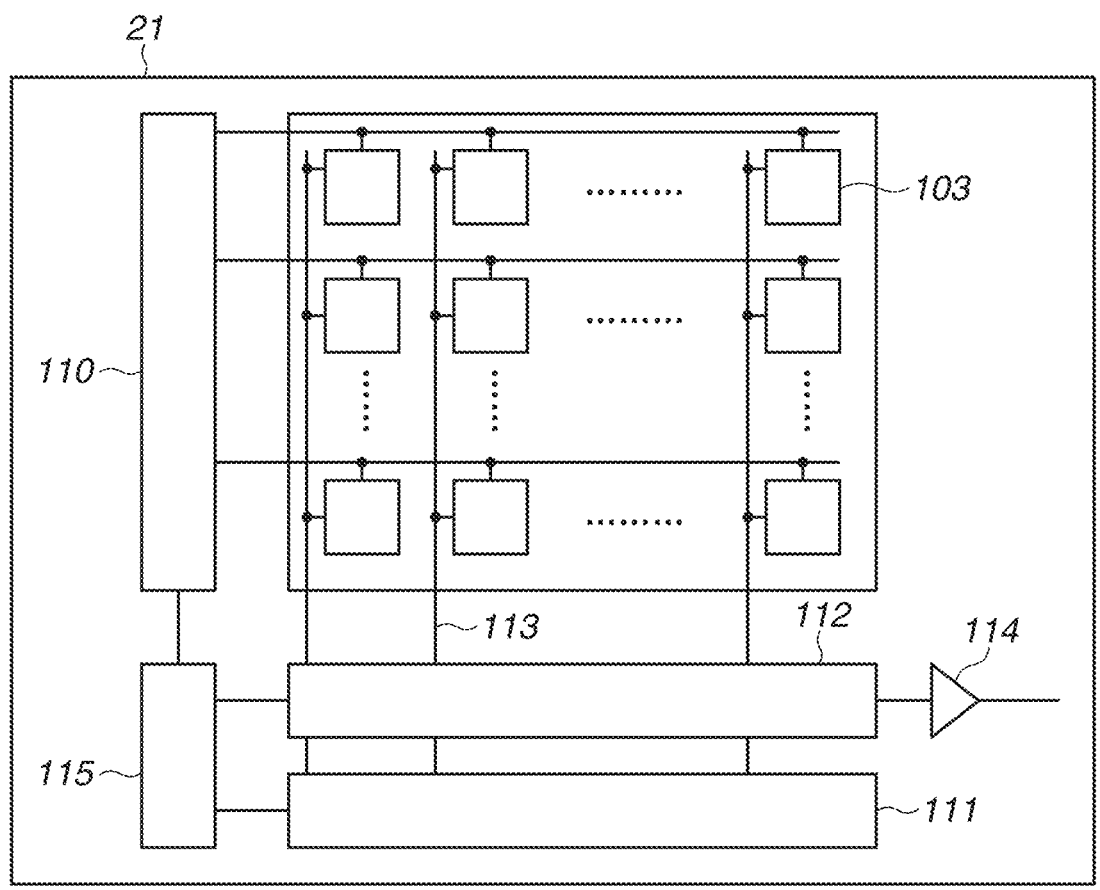
FIG. 3 is a diagram illustrating a layout example of a circuit substrate.

FIG. 3 is a block diagram illustrating a configuration of the circuit substrate 21. The circuit substrate 21 includes the signal processing units 103 each configured to process the electric charge that is photoelectrically converted by the photoelectric conversion element 102 in FIG. 2, a read-out circuit 112, a control pulse generation unit 115, a horizontal scan circuit unit 111, signal lines 113, and a vertical scan circuit unit 110.

Each photoelectric conversion element 102 in FIG. 2 and the corresponding signal processing unit 103 in FIG. 3 are electrically connected with each other via a connection wiring provided for each pixel 101.

The vertical scan circuit unit 110 receives a control pulse supplied from the control pulse generation unit 115 to supply a control pulse to each pixel 101. A logical circuit, such as a shift register and an address decoder, is used for the vertical scan circuit unit 110.

Signals output from the photoelectric conversion elements 102 of the pixels 101 are processed by the respective signal processing units 103. Each of the signal processing units 103 is provided with a counter, a memory, and the like, and digital values are written and stored in the memory.

The horizontal scan circuit unit 111 inputs a control pulse signal for selecting each column sequentially to the corresponding signal processing unit 103, in order to read out a signal from a memory of each pixel that stores a digital signal.

In the column selected by the horizontal scan circuit unit 111, a signal is output to the signal line 113 from the signal processing unit 103 of the pixel selected by the vertical scan circuit unit 110.

The signal output to the signal line 113 is output to a recording unit or a signal processing unit disposed outside the photoelectric conversion device 100 via an output circuit 114.

In FIG. 2, the photoelectric conversion elements 102 in the pixel region 12 may be one-dimensionally arranged. The function of the signal processing unit 103 is not necessarily provided in each of the photoelectric conversion elements 102, and, for example, one signal processing unit 103 may be shared by a plurality of photoelectric conversion elements 102, and the signal processing may be performed sequentially.

As illustrated in FIGS. 2 and 3, a plurality of signal processing units 103 are arranged in a region overlapping the pixel region 12 in a planar view. In addition, in a planar view, the vertical scan circuit unit 110, the horizontal scan circuit unit 111, the read-out circuit 112, the output circuit 114, and the control pulse generation unit 115 are arranged so as to overlap a region between the end of the sensor substrate 11 and the end of the pixel region 12. In other words, the sensor substrate 11 includes the pixel region 12 and a non-pixel region arranged around the pixel region 12. In a region overlapping the non-pixel region in a planar view, the vertical scan circuit unit 110, the horizontal scan circuit unit 111, the read-out circuit 112, the output circuit 114, and the control pulse generation unit 115 are arranged.

Figure 4:
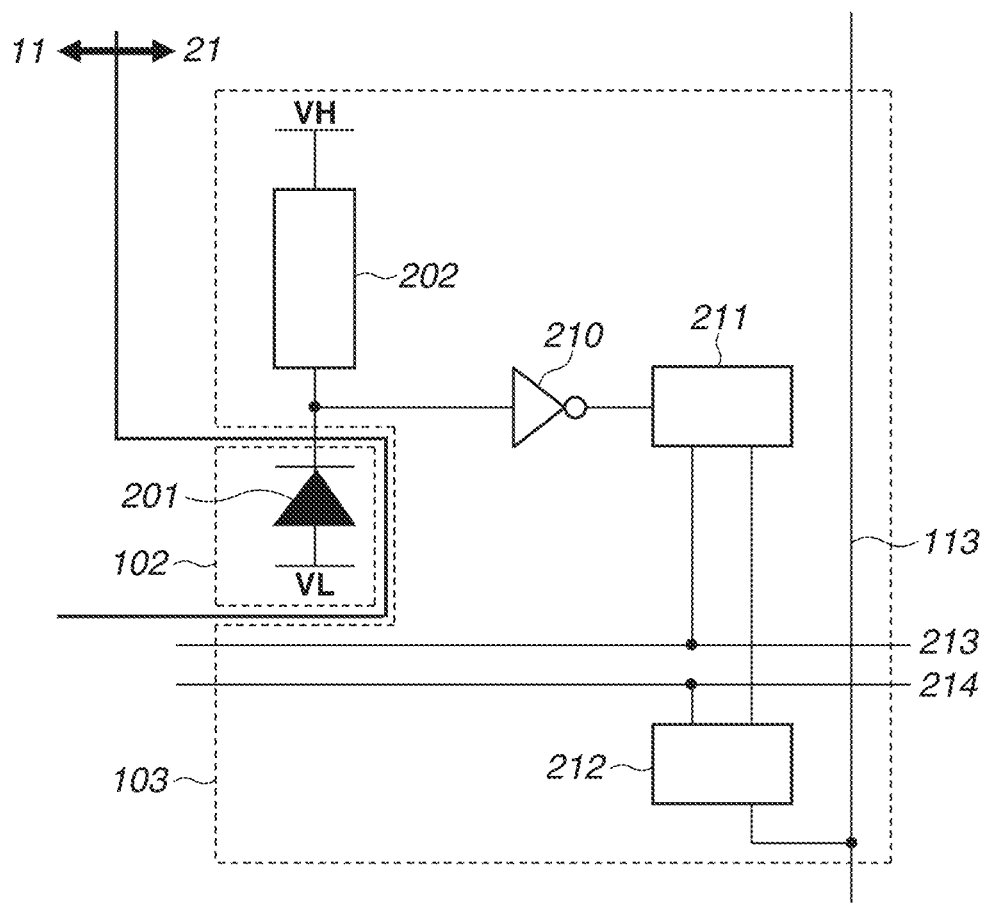
FIG. 4 is a block diagram including an equivalent circuit of the photoelectric conversion device.

FIG. 4 is an example of a block diagram including equivalent circuits illustrated in FIGS. 2 and 3. FIG. 4 illustrates a block diagram of a photoelectric conversion device including a commonly used APD.

In FIG. 4, the photoelectric conversion element 102 including the APD 201 is provided in the sensor substrate 11, and other components are provided in the circuit substrate 21.

The APD 201 generates an electric charge pair corresponding to the incident light, due to a photoelectric conversion. A voltage VL (first voltage) is supplied to the anode of the APD 201. Further, a voltage VH (second voltage) higher than the voltage VL supplied to the anode is supplied to the cathode of the APD 201. Reverse bias voltages are supplied to the anode and cathode to cause the APD 201 to perform an avalanche multiplication operation. By supplying such voltages, an avalanche multiplication of the electric charge generated by the incident light is caused to generate an avalanche current.

In addition, in a case where a reverse bias voltage is supplied to the APD 201, the APD 201 operates in two modes, i.e., a Geiger mode and a linear mode. In the Geiger mode, the APD 201 is operated with a voltage difference between the anode and the cathode larger than a breakdown voltage. In the linear mode, the APD 201 is operated with a voltage difference between the anode and the cathode near the breakdown voltage or smaller.

The APD to be operated in the Geiger mode is called a single photon avalanche diode (SPAD). For example, the voltage VL (first voltage) is −30 V, and the voltage VH (second voltage) is 3 V. The APD 201 may be operated in the linear mode or in the Geiger mode.

A quench element 202 is connected to the APD 201 and a power source that supplies the voltage VH. The quench element 202 functions as a load circuit (quench circuit) at a time of a signal multiplication due to the avalanche multiplication, and has a function (quench operation) of restraining the voltage supplied to the APD 201 to restrain the avalanche multiplication. Further, the quench element 202 has a function (recharge operation) of returning the voltage to be supplied to the APD 201 to the voltage VH by causing the current to flow by the amount corresponding to the voltage lowered due to the quench operation.

The signal processing unit 103 includes a waveform shaping unit 210, a counter 211, and a selection circuit 212.

In the present disclosure, the signal processing unit 103 only needs to include any of the waveform shaping unit 210, the counter 211, and the selection circuit 212.

The waveform shaping unit 210 shapes a cathode potential change of the APD 201 obtained when a photon is detected, and outputs a pulse signal. As the waveform shaping unit 210, for example, an inverter circuit is used. In FIG. 4, an example of the waveform shaping unit 210 in which one inverter is used is illustrated. However, a circuit configured of a plurality of inverters connected in series may be used, or another circuit having a waveform shaping effect may be used.

The counter 211 counts the number of pulse signals output from the waveform shaping unit 210 and stores the count value. Further, the signal (count value) stored in the counter 211 is reset when a control pulse pRES is supplied thereto via a drive line 213.

A control pulse pSEL is supplied to the selection circuit 212 from the vertical scan circuit unit 110 illustrated in FIG. 3 via a drive line 214 illustrated in FIG. 4 (not illustrated in FIG. 3) to switch between an electrical connection state and an electrical non-connection state of the counter 211 and the signal line 113. The selection circuit 212 includes, for example, a buffer circuit for outputting a signal.

A switch such as a transistor may be provided between the quench element 202 and the APD 201 or between the photoelectric conversion element 102 and the signal processing unit 103 to switch the electrical connection. Similarly, a switch such as a transistor may be provided to electrically switch the supply of the voltage VH or the voltage VL to be supplied to the photoelectric conversion element 102.

In the present exemplary embodiment, the configuration using the counter 211 is described. However, instead of the counter 211, the photoelectric conversion device 100 may use a Time to Digital Converter (TDC) and a memory to obtain a pulse detection timing. In this case, the generation timing of the pulse signal output from the waveform shaping unit 210 is converted into a digital signal by the TDC. A control pulse pREF (reference signal) is supplied to the TDC from the vertical scan circuit unit 110 illustrated in FIG. 3 via a drive line to measure the timing of the pulse signal. The TDC obtains a signal, as a digital signal, with the control pulse pREF as a reference, when an input timing of a signal output from each pixel 101 via the waveform shaping unit 210 is a relative time.

Figure 5A:
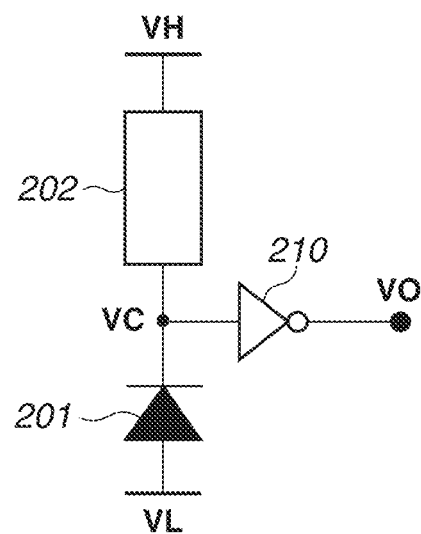
FIGS. 5A, 5B and 5C are diagrams illustrating a relationship between an operation of an avalanche photodiode (APD) and an output signal.
Figure 5B:
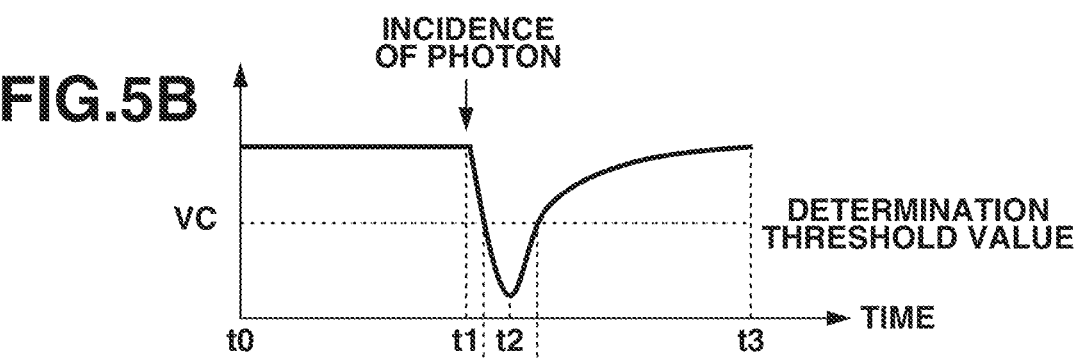
Figure 5C:
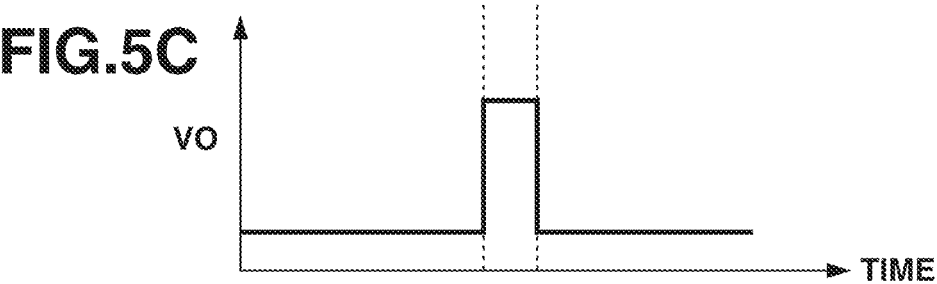

FIGS. 5A, 5B, and 5C are diagrams schematically illustrating a relationship between the operation of the APD 201 and the output signal.

FIG. 5A is a diagram illustrating the APD 201, the quench element 202, and the waveform shaping unit 210, which are extracted from FIG. 4. In FIG. 5A, the input side of the waveform shaping unit 210 is defined as VC, and the output side thereof is defined as VO. FIG. 5B illustrates a voltage of VC in FIG. 5A, and FIG. 5C illustrates a signal of VO in FIG. 5A.

From a time t0 to a time t1, the voltage difference "VH−VL" is applied to the APD 201 in FIG. 5A. At the time t1, when a photon is incident on the APD 201, an avalanche multiplication occurs in the APD 201 to cause the avalanche multiplication current to flow in the quench element 202. As a result, the voltage of VC drops. If the voltage drop amount further increases and the voltage difference applied to the APD 201 becomes smaller, the avalanche multiplication of the APD 201 stops at a time t2, and the voltage level of VC does not drop more than a predetermined value. Then, between the time t2 and a time t3, a current flows from the voltage VL to VC to make up the voltage drop, and at the time t3, the potential level of VC is statically stabilized to the original potential level. At this time, in a case where the output waveform of VC exceeds a threshold value, the output waveform is shaped by the waveform shaping unit 210, and output to VO as a signal.

In addition, the layout of the signal lines 113, the read-out circuit 112, and the output circuit 114 is not limited to the layout in FIG. 3. For example, the signal lines 113 may be arranged to extend in a row direction, and the read-out circuit 112 may be arranged at a position to which the signal lines 113 extend.

Figure 6A:
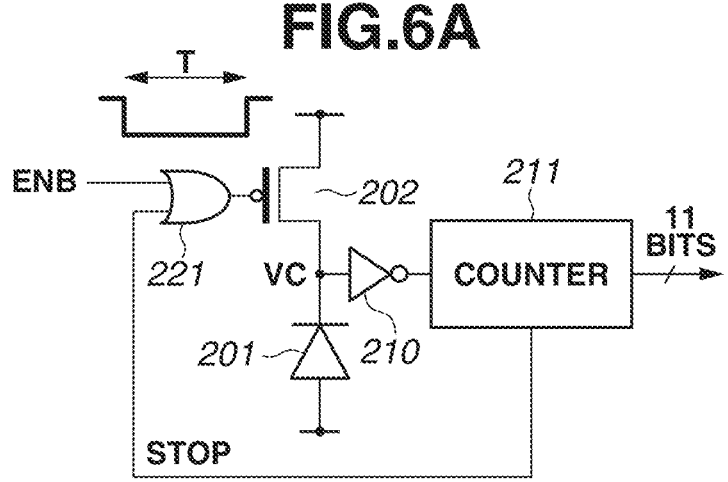
FIGS. 6A, 6B and 6C are diagrams each illustrating a diagram including a pixel circuit block diagram and an equivalent circuit diagram, according to comparative examples and a first exemplary embodiment.
Figure 6B:
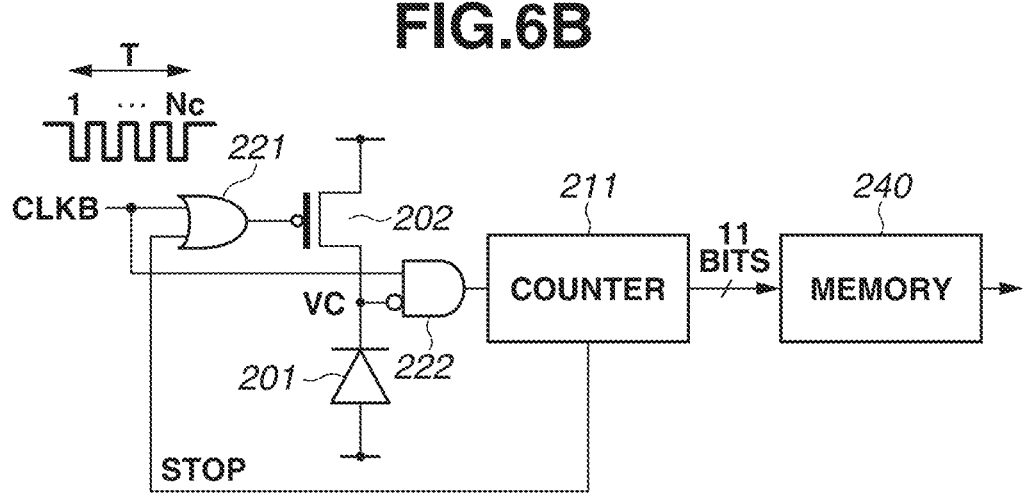
Figure 6C:
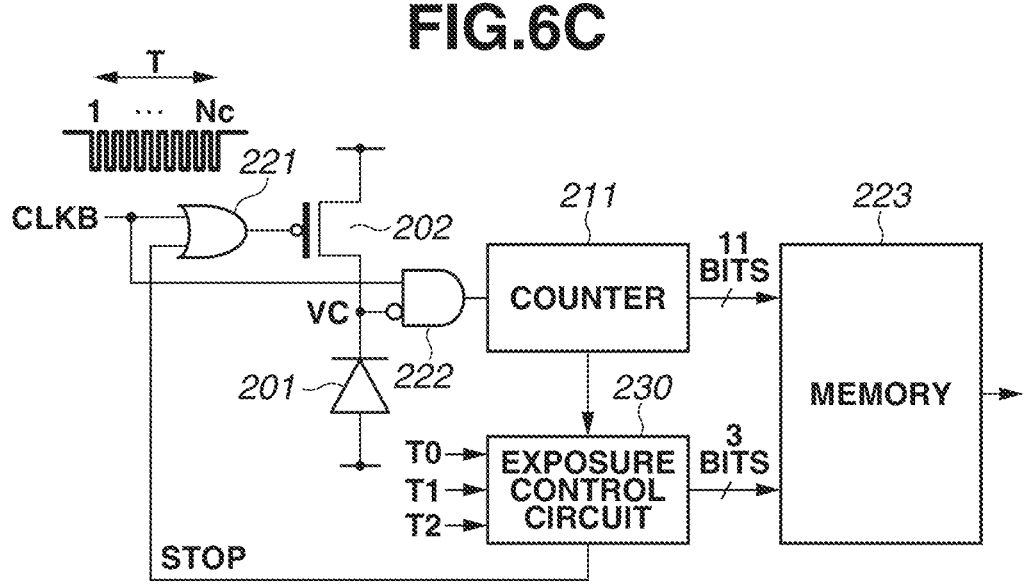
Figure 7A:
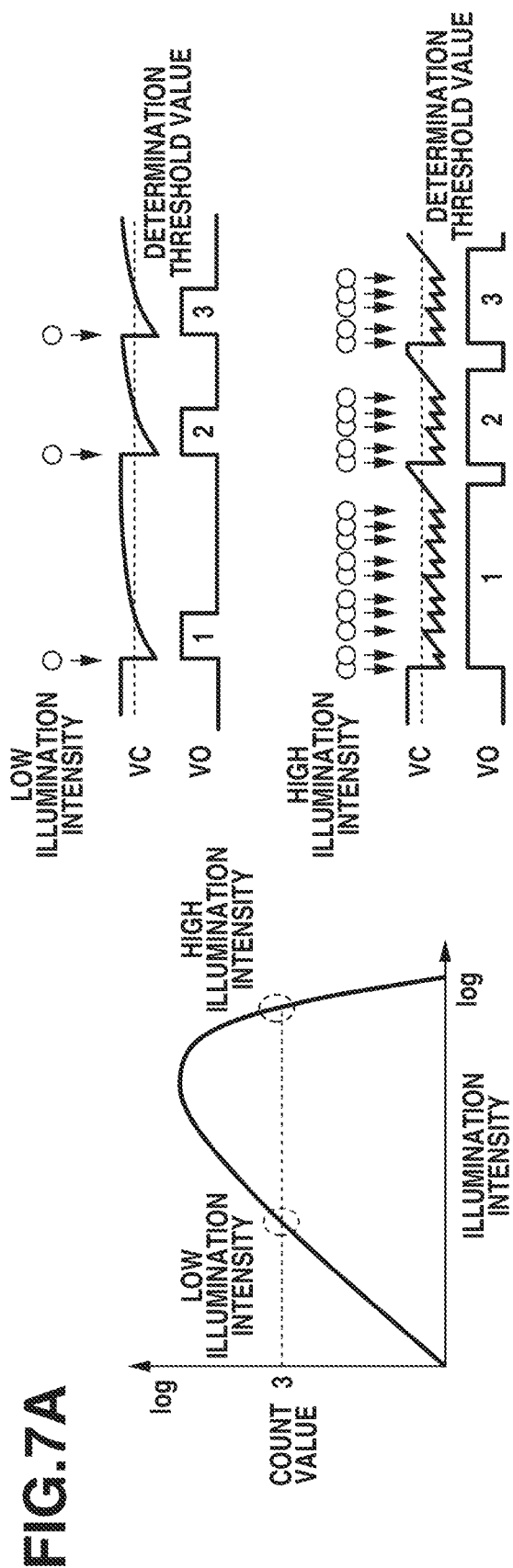
FIGS. 7A and 7B are diagrams each illustrating a relationship between illumination intensities and count values according to the comparative examples.
Figure 7B:
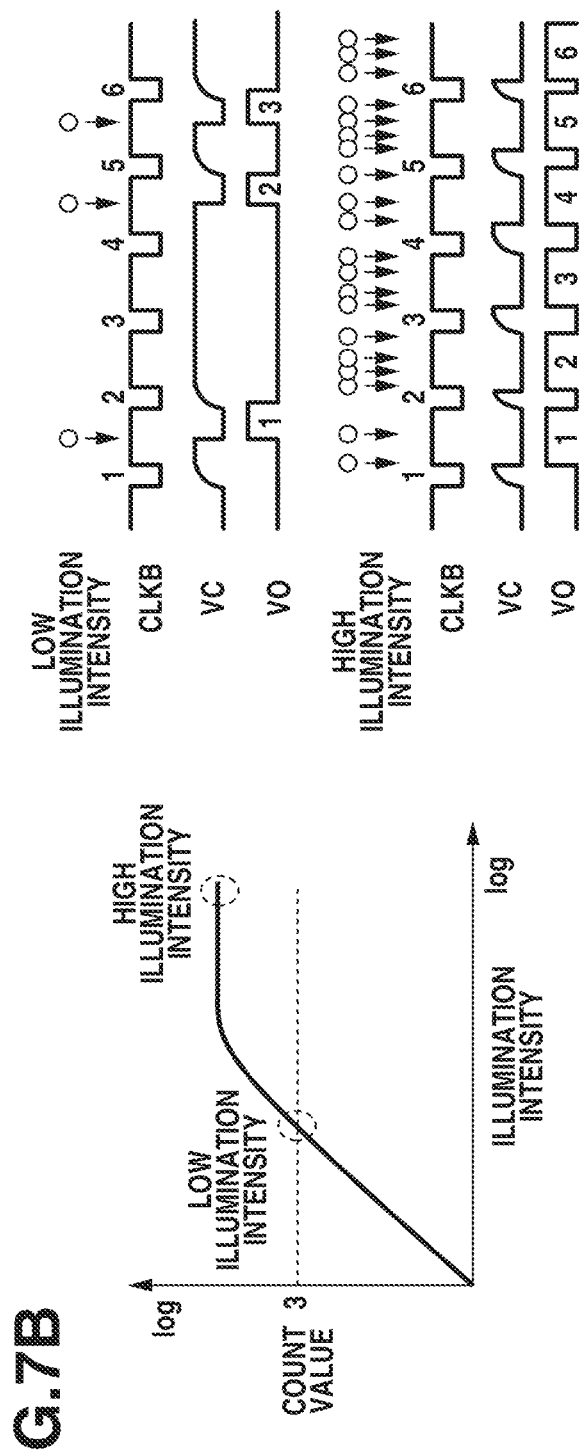
Figure 8A:
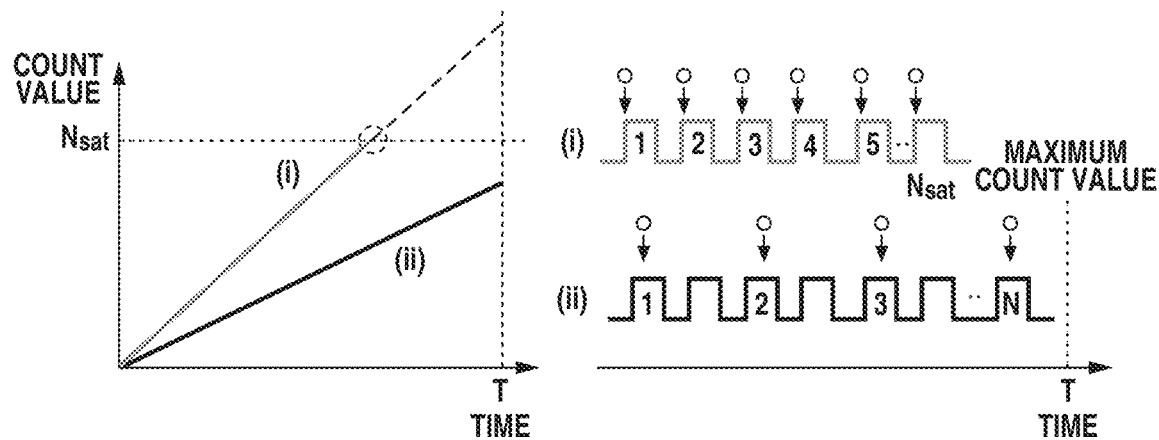
FIGS. 8A, 8B, and 8C are diagrams each illustrating a relationship between times and count values according to the comparative examples and the first exemplary embodiment.
Figure 8B:
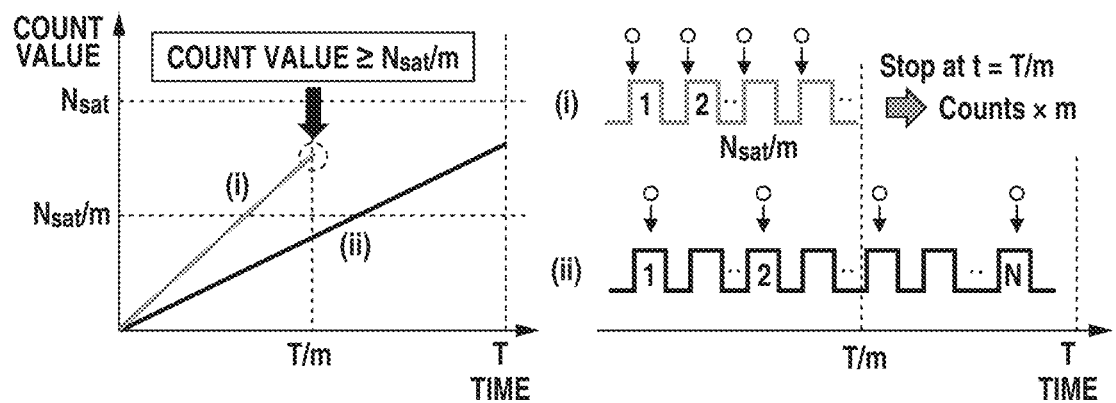
Figure 8C:
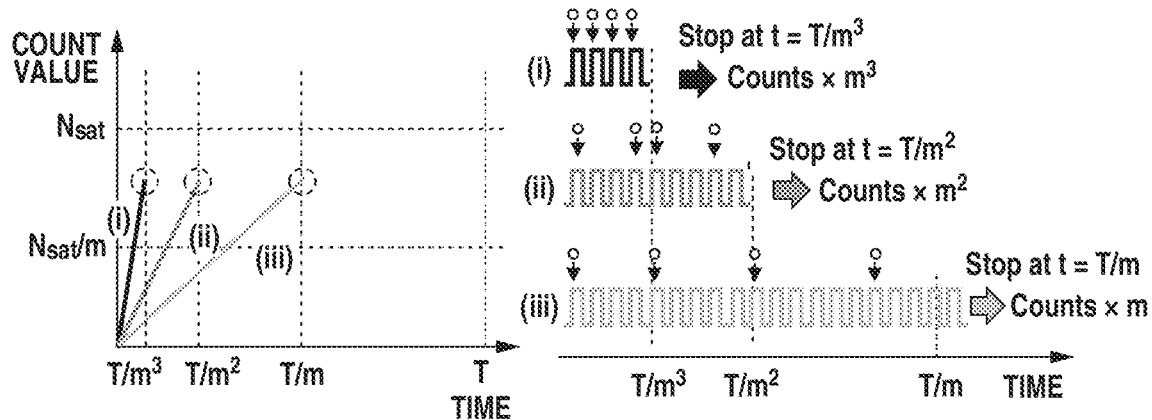

FIGS. 6A, 6B, and 6C each illustrate a diagram including a pixel circuit block diagram and an equivalent circuit diagram. FIGS. 6A and 6B illustrate configurations according to comparative examples, and FIG. 6C illustrates a configuration according to a first exemplary embodiment. FIGS. 7A and 7B illustrate the comparative examples. FIGS. 8A and 8B illustrate the comparative examples, and FIG. 8C illustrates the present exemplary embodiment.

Comparative Example 1: Passive Recharge Circuit

FIG. 6A collectively illustrates a passive recharge pixel circuit block diagram and an equivalent circuit diagram as a comparative example 1. A gate of a transistor serving as the quench element 202 connected to the cathode side of the APD 201 and the output of a logic circuit 221 (OR circuit) are the same node. The logic circuit 221 is configured to accept a signal ENB and a signal STOP. The signal ENB keeps a low level during an exposure period T, and keeps a high level during other periods.

In a case where the signal STOP is at a low level and the signal ENB is at a low level, the transistor serving as the quench element 202 turns on, and the APD 201 is brought into a recharge state. Then, the APD 201 shifts to a waiting state where avalanche multiplication can be performed after a predetermined period. In a case of other signal patterns, the quench element 202 turns off, and the APD 201 is not brought into a recharge state but brought into a non-waiting state where avalanche multiplication cannot be performed. The waveform shaping unit 210 is configured of an inverter, and the counter 211 is provided with an 11-bit flip-flop circuit. For example, when the count value of the counter 211 reaches a maximum count value "2047", the signal STOP shifts from a low level to a high level, and the transistor serving as the quench element 202 turns off. In this way, even if the signal ENB shifts to a low level, the quench element 202 keeps being off, and the non-waiting state of the APD 201 is held.

The drawings on the right side in FIG. 7A each illustrate a voltage of VC in FIG. 6A and a signal of VO.

In a case of low illumination intensity, since the incident intervals of photos are long, a sufficient time can be secured until the voltage of VC returns to a high level state by being recharged after the voltage of VC has become low after an incidence of a photon.

The drawing on the upper right side (low illumination intensity) in FIG. 7A indicates that three pulses can be counted corresponding to 3 photons. On the other hand, in a case of high illumination intensity, since the incident intervals of photons are short, the voltage of VC is kept low, and the voltage does not return to the high level state. Thus, it takes time to exceed the determination threshold from the lower side to the upper side thereof. The drawing on the lower right side in FIG. 7A indicates that only 3 pulses are counted, even though about 20 photons are incident. In other words, some photons are omitted from the count.

As a result, in the case of the passive recharge type configuration illustrated in FIG. 6A, as illustrated in FIG. 7A, the count values in the low illumination intensity state and the high illumination intensity state can become equal to each other. Further, if photons are incident more frequently, the voltage of VC is kept low, and the count value does not exceed the determination threshold from the lower side to the upper side. In this case, the voltage of VO is kept high, and no signal is generated. Accordingly, in the case of passive recharge type configuration illustrated in FIG. 6A, since a correct count value cannot be obtained at the high illumination intensity, the dynamic range of the photoelectric conversion device 100 becomes narrow.

Comparative Example 2: Clock Recharge Circuit

FIG. 6B illustrates a diagram including a clock recharge pixel circuit block diagram and an equivalent circuit diagram as a comparative example 2. The logic circuit 221 (OR circuit) is configured to receive a signal CLKB and a signal STOP via the input terminals thereof. The signal CLKB is a clock signal including Nc pulse signals during an exposure period T. In FIG. 6B, in a case where the signal STOP is at a low level and the signal CLKB is at a low level, the transistor serving as the quench element 202 turns on and the APD 201 is recharged. In a case of any other combination patterns of the signal STOP and the signal CLKB, the quench element 202 turns off. For example, in a case where the signal CLKB is at a high level, the quench element 202 is turned off after the recharge, and thus the APD 201 is in the waiting state where avalanche multiplication can be performed. In other words, a circuit (transistor) is provided between the APD 201 and the power source (voltage VH), and the circuit controls switching between a first state and a second state. In the first state, the circuit electrically connects the APD 201 and the power source. In the second state, the circuit does not electrically connect the APD 201 and the power source. In this case, the first state is the recharge state, and the second state is the waiting state.

A logic circuit 222 (AND circuit with a logic of one input terminal being inverted) is provided between the cathode of the APD 201 and the counter 211 so that the signal CLKB and the voltage of VC can be input. The logic circuit 222 is a logic circuit to which the output from VC is input in an inverted state. When a photon is incident on the APD 201, the value of VC shifts from a high level to a low level. In this case, when the signal CLKB is at a high level, the output of the logic circuit 222 becomes a high level. Then, in a case where the signal CLKB shifts from the high level to a low level, the output of the logic circuit 222 shifts to a low level, and thus the output signal is generated.

The drawings on the right side in FIG. 7B each illustrate the signal CLKB, the voltage of VC, and the signal of VO in FIG. 6B.

First, in a low illumination intensity state, when a photon is incident with the signal CLKB at a high level (waiting state), the voltage of VC drops and shifts to a low level. Since the signal CLKB is at the high level, the output from VO is at a high level, and when the signal CLKB shifts to a low level, the output from VO shifts from the high level to a low level, so that a signal is generated.

On the other hand, in a high illumination intensity state, even in a case where photons are frequently incident with the signal CLKB at a high level (waiting state), as long as the signal CLKB is at the high level, the value of VO that has shifted to the high level keeps the high level. Next, when the signal CLKB shifts from the high level to a low level, the output from VO shifts from the high level to a low level, so that a signal is generated.

In this way, in the clock recharge circuit, the state where the count values become equal to each other in the low illumination intensity state and the high illumination intensity state and the state where no signal is generated, which occur in the passive recharge circuit, are resolved. More specifically, the clock recharge circuit has an advantage that the count value in the low illumination intensity state does not become larger than that in the high illumination intensity state. The signal output from the logic circuit 222 is output to the outside from the counter 211 via a memory 240. In addition, whether the counter 211 performs counting at a falling edge of an output pulse of the logic circuit 222 or at a rising edge of the previous pulse of the logic circuit 222 can be set as appropriate.

DESCRIPTION OF PRESENT EXEMPLARY EMBODIMENT

FIGS. 8A, 8B, and 8C each illustrates times and count values, in a clock recharge drive. In each of FIGS. 8A, 8B, and 8C, "Nsat" is a number corresponding to the maximum count value of the counter 211. Details of "Nsat" will be described below.

In FIG. 8A, a case (ii) illustrates a case in a low illumination intensity state where the count value has not reached Nsat at the completion of the exposure period T. On the other hand, a case (i) illustrates a case in a high illumination intensity state where the count value has reached Nsat before the completion of the exposure period T. In this case, it is possible to calculate the count value at the completion of the exposure period T using an extrapolation method if the time at which the count value has reached Nsat is recorded. The count value calculated using the extrapolation method is also called a calculated count value. As a result, the dynamic range of the photoelectric conversion device 100 can be expanded.

Also in FIG. 8B, a case (i) illustrates a case in a high illumination intensity state, and a case (ii) illustrates a case in a low illumination intensity state.

In the case (i) of FIG. 8B, it is determined whether the count value has reached a predetermined count value (Nsat/m) or more at a predetermined timing (T/m) before the completion of the exposure period T. For example, FIG. 8B illustrates a case where m=2, and it is determined whether the count value has reached the predetermined count value or more at a ½ timing of the exposure period T. Then, in a case where the count value has reached the predetermined count value or more, the exposure stops. In this case, a value obtained by multiplying the measured count value by "m" is treated as a calculated count value at the completion of the exposure period T. For example, m=2.

FIG. 8C is a diagram illustrating a driving method according to the present exemplary embodiment. More specifically, FIG. 8C illustrates a case where a plurality of predetermined determination timings (predetermined check points) is provided while employing the driving method illustrated in the case (i) of FIG. 8B. In a case (i) of FIG. 8C, it is determined whether the count value is a predetermined count value (Nsat/m) or more in a first exposure period (T/m³). In a case of (ii) of FIG. 8C, it is determined whether the count value is the predetermined count value (Nsat/m) or more in a second exposure period (T/m²). In a case (iii) of FIG. 8C, it is determined whether the count value is the predetermined count value (Nsat/m) or more in a third exposure period (T/m). In this case, values respectively obtained by multiplying the measured count values by "m³", "m²", and "m", for example, 8, 4, and 2, are treated as the calculated count values at the completion of the exposure period T.

In this case, at each determination timing, it is determined whether the count value is the predetermined count value or more. When the count value is the predetermined count value or more, the exposure is stopped, and the count value is output. Accordingly, in the case where the exposure is stopped, the count value is Nsat/m or more and Nsat or less.

It is possible to further expand the dynamic range of the photoelectric conversion device 100 if determinations are performed at the plurality of check points.

Figure 9A:
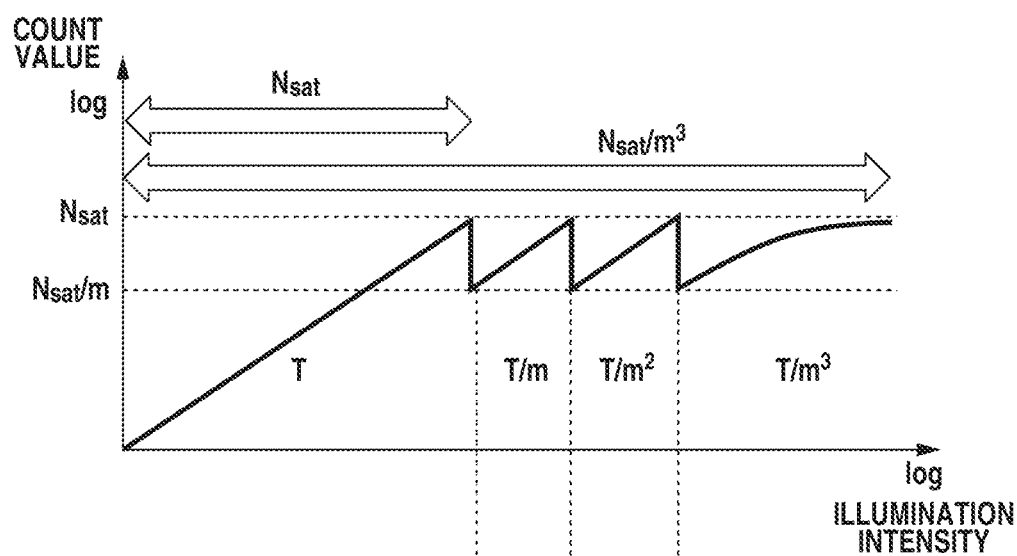
FIGS. 9A and 9B are graphs respectively illustrating a relationship between illumination intensities and count values and a relationship between illumination intensities and exposure times according to the first exemplary embodiment.
Figure 9B:
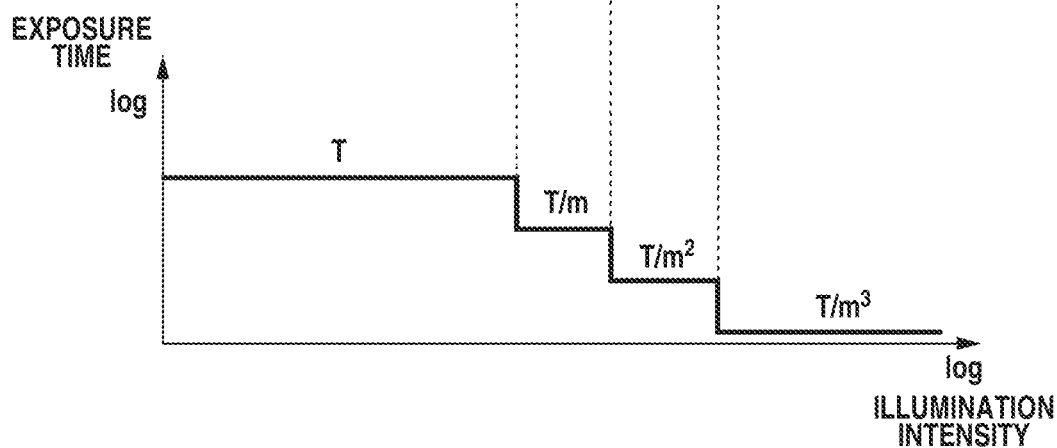

FIG. 9A illustrates a relationship between illumination intensities and count values in the configurations illustrated in FIGS. 8B and 8C. Further, FIG. 9B illustrates a relationship between illumination intensities and exposure times in these configurations. In a case of a region having a lowest illumination intensity, since the counting is continued until the exposure period T ends, the exposure time becomes longest as illustrated in FIG. 9B. In the case of the region having the lowest illumination intensity, since the counting is continued until the counter 211 is saturated, the counter 211 counts from 0 to Nsat as illustrated in FIG. 9A. Next, in a case of a region having a slightly higher illumination intensity, it is determined that the count value is the predetermined count value (Nsat/m) or more at the third exposure period (T/m), and the exposure is stopped. Since the exposure is stopped in the middle, the exposure period becomes short as illustrated in FIG. 9B. Further, as illustrated in FIG. 9A, the count value output in this case is Nsat/m or more and Nsat or less. The count values are also Nsat/m or more and Nsat or less in the case where the exposure is stopped in the second exposure period (T/m²) and the case where the exposure is stopped in the first exposure period (T/m³).

In the case where the exposure is stopped in the first exposure period (T/m³), the counter 211 can count up to Nsat at maximum. In this case, the calculated count value is a value obtained by multiplying Nsat by m³, i.e., Nsat×m³. In other words, the count values usable for the image formation can be expanded from Nsat to Nsat×m³. Thus, the dynamic range of photoelectric conversion device 100 can be expanded. Further, it is possible to control whether to stop counting at a different timing for each pixel. More specifically, the exposure period can be controlled for each pixel, and the dynamic range can be expanded for each pixel. Hereinbelow, a description will be given of an example of a circuit or a driving method to implement the method described above.

Exemplary Embodiment: Pixel Circuit Block Diagram

FIG. 6C is a block diagram illustrating a pixel circuit with a configuration for controlling the exposure period for each pixel. The APD 201, the quench element 202, the logic circuit 221, the logic circuit 222, and the counter 211 are the same as those illustrated in FIG. 6B, and thus descriptions thereof are omitted.

The signal CLKB in FIG. 6C is the same as that in FIG. 6B in that the clock signal (Nc pulse signals) is input during the exposure period T (hereinbelow, also referred to as a maximum exposure period). However, as will be described below, the pulse cycle of the clock signal is shorter in FIG. 6C than in FIG. 6B. Further, in FIG. 6C, a signal is input from the counter 211 to an exposure control circuit 230, and a signal is input from the exposure control circuit 230 to the memory 223 as well. The number of bits of the exposure control circuit 230 is less than that of the flip-flop circuit included in the counter 211.

Figure 10:
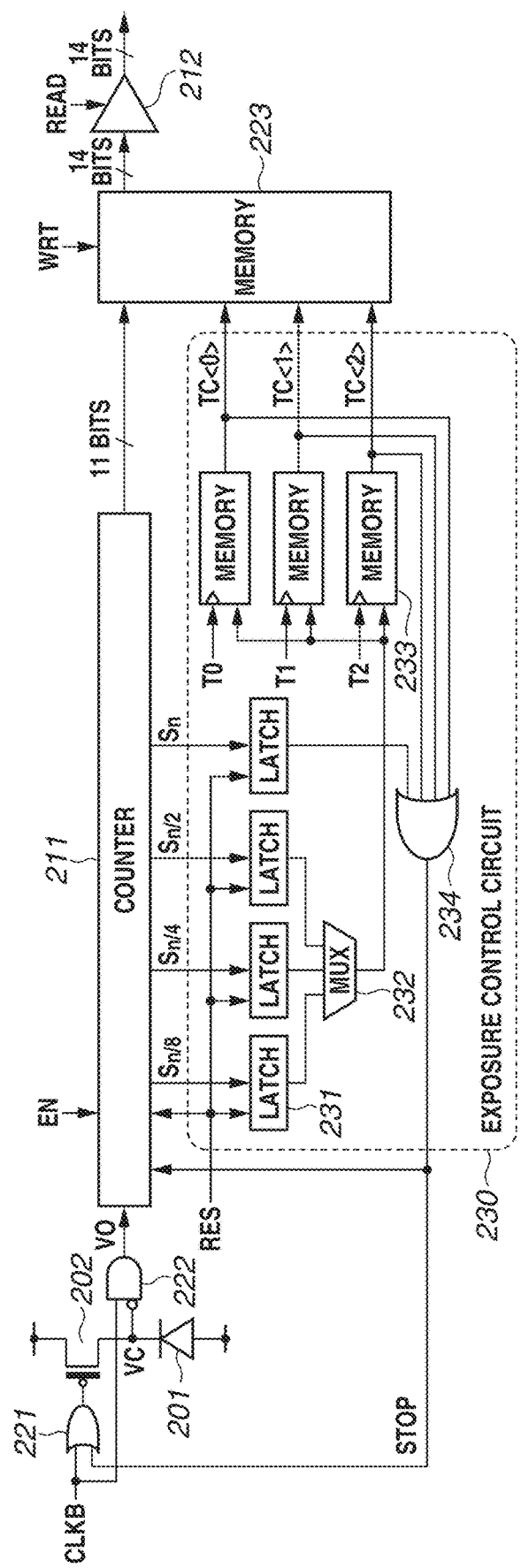
FIG. 10 is a block diagram illustrating details of a photoelectric conversion element according to the first exemplary embodiment.

FIG. 10 is a block diagram illustrating details of the pixel circuit according to the present exemplary embodiment. Descriptions of the components with the same numerals or symbols as those in FIG. 6C assigned thereto are omitted. Since the counter 211 includes, for example, 11-bit flip-flop circuit, the saturation value of the counter 211 is "2047".

Further, a signal EN is input to the counter 211. The signal EN is a signal to define the exposure period T. More specifically, when the signal EN shifts from a low level to a high level, the exposure period T starts, and when the signal EN shifts from the high level to the low level, the exposure period T ends. Then, the counter 211 is brought into a stop state.

The counter 211 is configured to input a signal to the exposure control circuit 230. The exposure control circuit 230 includes a plurality of latches 231. In FIG. 10, first to fourth latches 231 are provided from the left side to the right side in FIG. 10. These four latches 231 and a multiplexer circuit 232 determine a predetermined count value (threshold value) at a predetermined determination timing.

The first latch 231 (leftmost latch) is configured in such a manner that a signal $S_{n/8}$ is input thereto when the count value reaches the ⅛ value of the maximum count value of the counter 211, i.e., m=8. As described above, since the maximum count value of the counter 211 is "2047", a value obtained by dividing this maximum count value by 8, i.e., a ⅛ of the maximum count value, is not an integer. For this reason, for convenience, "2048", which is close to the maximum count value and easy to be used for calculation, is employed as an equivalent to the maximum count value, and used as a reference for $S_{n/8}$, $S_{ng}$, and $S_{n/2}$.

In the present exemplary embodiment, a signal output when the count value reaches 2048/8=256 or more is defined as the signal $S_{n/8}$.

Similarly, the second latch 231 (second from the left) is configured in such a manner that a signal Sin is input thereto when the count value reaches the ¼ value of the maximum count value of the counter 211, i.e., m=4. In the present exemplary embodiment, for convenience, the signal output when the count value is 2048/4=512 or more is defined as a signal $S_{n/4}$.

Further, in a similar manner, the third latch 231 (second from the right) is configured in such a manner that a signal $S_{n/2}$ is input thereto when the count value reaches the ½ value of the maximum count value (2048) of the counter 211, i.e., m=2. In the present exemplary embodiment, for convenience, the signal output when the count value is 2048/2=1024 or more is defined as a signal $S_{n/2}$.

Further, in a similar manner, the fourth latch 231 (rightmost latch) is configured in such a manner that a signal $S_n$ is input thereto when the count value reaches the maximum count value of the counter 211. In the present exemplary embodiment, a signal output when the count value of the 11-bit counter 211 reaches "2047" that is the maximum count value is defined as a signal $S_n$.

In a case where the signal $S_n$ is input to the fourth latch 231, since the counter 211 has reached the maximum count value, the signal STOP is output via a logic circuit 234 (OR circuit). The signal STOP is input to the counter 211 and the logic circuit 221, and thus the operation of the counter 211 is stopped. Accordingly, the transistor serving as the quench element 202 turns off.

A control signal (not illustrated) is input to the multiplexer circuit 232, and a signal stored in any of the first latch 231 to the third latch 231 is selected and stored in a memory 233.

For example, the signal of the first latch 231 is used to expand the dynamic range. As described above, since the count values usable for the image formation can be expanded from Nsat to Nsat×m³, the dynamic range can be expanded as "m" is larger. For this reason, the signal of the first latch 231 (m=8) is used. On the other hand, if the dynamic range is expanded too much, there may be a case where strangeness occurs in a reconstructed image. For example, in a case where there is a step in an image, a signal stored in the third latch 231 (m=2) is used. In this way, a latch can be selected as appropriate depending on the usage from the first latch 231 to the third latch 231.

In FIG. 10, first to third memories 233 are provided in order from the top to the bottom. As will be described below, at each of timings T0, T1, and T2, whether the count value is a threshold value or more is checked, and in a case where the count value is the threshold value or more at the timing T0, "1" is recorded in the first memory 233. Similarly, if the count value is the threshold value or more at the timing T1, "1" is recorded in the second memory 233. Similarly, if the count value is the threshold value or more at the timing T2, "1" is recorded in the third memory 233.

TC<0>, TC<1>, and TC<2>, which are time codes (time information), are output from the memories 233, and stored in the memory 223. An 11-bit signal is output from the counter 211, and a 3-bit signal is output from the memories 233. As a result, the memory 223 is a 14-bit memory in total.

In a case where any of TC<0>, TC<1>, and TC<2> is "1", this indicates that the count value is the threshold value or more (Nsat/m or more), so that the signal STOP is output via the logic circuit 234 (OR circuit).

When the read-out signal WRT is input to the memory 223, the 11-bit signal of the counter 211 at the time and the 3-bit signal of TC<0>, TC<1>, and TC<2> are stored in the memory 223.

Further, when the read-out signal READ is input to the selection circuit 212, the signal stored in the memory 223 is read out from the selection circuit 212 to the outside of the photoelectric conversion device 100. For example, with the signal WRT, information of all rows is collectively stored in the memory 223, and with the signal READ, the information is read out sequentially for each row. In this way, the global shutter system that starts the exposure period for all the rows collectively can be implemented.

Exemplary Embodiment: Timing Chart

Figure 11:
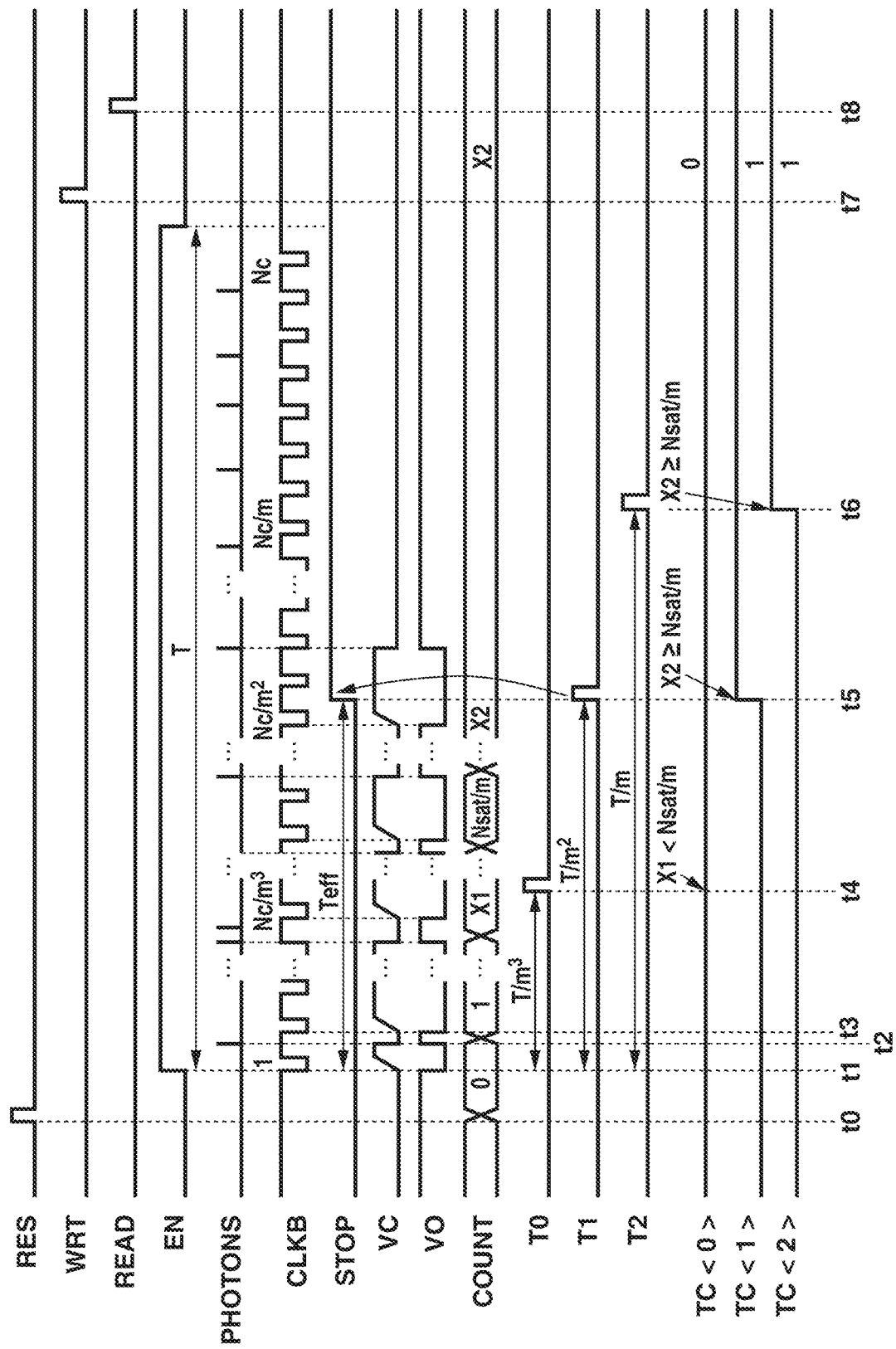
FIG. 11 is a timing chart of the photoelectric conversion element according to the first exemplary embodiment.

FIG. 11 is a timing chart according to the present exemplary embodiment.

At a time t0, the pulse of the signal RES is set to ON. As illustrated in FIG. 10, the signal RES is input to the latches 231 and the counter 211. Information about the previous frame stored in the latches 231 and the counter 211 can be reset by this input of the signal RES. Thus, the count value COUNT of the counter 211 becomes "0". Further, although not illustrated in FIG. 10, the signal RES may be input to the memory 223 and the memories 233 to reset the information about the previous frame.

At a time t1, the signal EN is set to ON, and the exposure period T starts. Herein, the exposure period T is a maximum exposure period. In a case where few photons are incident, the counter 211 is not saturated, so that the counter 211 continues counting during the maximum exposure period. However, as will be described below, in a case where the counter 211 is saturated or the count value exceeds the predetermined threshold value within a predetermined exposure period, the signal STOP becomes high, and the effective exposure period is shortened less than the maximum exposure period.

At the time t1, the signal CLKB shifts from a high level to a low level. Since the signal STOP is at a low level, the APD 201 starts being recharged, the voltage of VC gradually increases, and the APD 201 is brought into a waiting state. When the signal CLKB shifts from the high level to the low level at the time t1, the value of VO changes from a high level to a low level because no photon has been incident yet.

At a time t2, when a photon is incident, an avalanche multiplication starts, and the potential of VC decreases. Since the signal input from VC to the logic circuit 222 is at a low level and the signal CLKB is at the high level, the value of VO, which is an output from the logic circuit 222, shifts from the low level to a high level. With this shift, the count value COUNT changes from "0" to "1". In other words, in this exemplary embodiment, the counting is performed using the rising edge of VO.

At a time t3, when the signal CLKB shifts from the high level to the low level, like the state at the time t1, the recharge starts, and the potential of VC changes. Further, since the signal CLKB shift from the high level to the low level, the value of VO shifts from the high level to a low level. In other words, the waveform of VO rising at the time t2 falls at the time t3.

The signal T0 shifts from a low level to a high level at a time t4, at which $T/m^3$ has elapsed since the start of the exposure period T. Herein, m is an arbitrary number and, for example, when the signal of the latch 231 (leftmost latch) that receives the $S_{n/8}$ signal is selected using the multiplexer circuit 232, m is "8". Accordingly, the time t4 is a time at which T/512 has elapsed since the start of the exposure period T.

Further, focusing on the signal CLKB, since the number of total pulses in the exposure period T is Nc. At the time t4 at which T/512 has elapsed since the start of the exposure period T, the number of total pulses is thus $Nc/m^3$.

At this time, $Nc/m^3$, which is the total number of pulses until a time point at which $T/m^3$ has elapsed since the start of the exposure period T, is set to a value more than or equal to the maximum counter value of the counter 211. This is because the expansion of the dynamic range is limited if $Nc/m^3$ is set to a value less than the maximum counter value of the counter 211. In addition, in a case where the dynamic range may be restrained to some extent, $Nc/m^3$ may be set to a value less than the maximum counter value of the counter 211. For example, $Nc/m^3$ can be set ¾ or more of the maximum counter value.

In the present exemplary embodiment, whether the count value is the threshold value or more is determined at a timing included in the exposure period T (maximum exposure period), at which three exposure periods, each of which is shorter than the maximum exposure period, are completed.

In this case, assuming that the three exposure periods are defined as a first exposure period (first determination timing), a second exposure period (second determination timing), and a third exposure period (third determination timing) in order from the shortest exposure period, the first exposure period is the shortest exposure period. In the present exemplary embodiment, the first exposure period, the second exposure period, and the third exposure period correspond to the exposure period $T/m^3$, the exposure period $T/m^2$, and the exposure period $T/m$, respectively. In other words, "m" indicates a ratio between the lengths of the first exposure period and the second exposure period, and a ratio between lengths of the second exposure period and the third exposure period.

As described above, since m=8 in this case, the second exposure period is 8 times longer than the first exposure period. Further, the third exposure period is 8 times longer than the second exposure period. The "8 times" is merely an example, and the ratio may be 2 times or more, or 4 times or more.

Among these settings, in order to set the number of total pulses $Nc/m^3$ until the time point at which $T/m^3$ has elapsed from the start of the exposure period T to be the maximum count value of the counter 211 or more, $Nc/m^3$ is set to be "2048" in a case where, for example, the maximum count value is "2047". In other words, $Nc/m^3$ is set to be a value of the maximum count value of the counter 211 or more. Thus, the number of total pulses Nc during the exposure period T is about one million in a case of m=8. In the comparative examples using the normal clock recharge drive, the number of pluses Nc in the exposure period T is "2048" in a case where the number of pluses Nc is set to a number equivalent to the maximum count value of the counter 211. Thus, compared with the comparative examples, the number of pulses Nc according to the present exemplary embodiment is extremely large, and the pulse cycle of the clock signal is extremely short. For this reason, the pulse signal cycles are illustrated to be different from each other in FIGS. 6B and 6C.

At the time t4, the count value COUNT is "X1", and is smaller than "Nsat/m", which is the threshold value (i.e., X1<Nsat/m). In this case, "Nsat" is, for example, "2048". As described above, "Nsat" is a value equivalent to the maximum count value of the counter 211 and is a value to make the calculation easier. In the present disclosure, the "value equivalent to the maximum count value of the counter 211" may also be treated as "the maximum count value of the counter 211".

Further, as described above, "m" is the ratio between the lengths of the exposure periods, and is, for example, m=8. Accordingly, "Nsat/m" is, for example, "256". In the example illustrated in FIG. 11, the count value is smaller than the threshold value, the first latch 231 (leftmost latch) does not latch the signal $S_{n/8}$. Accordingly, the signal VC<0> serving as a time code stays at a low level, and "0" is input to the first memory 233 (uppermost memory).

Between the time t4 and a time t5, the count value COUNT becomes "Nsat/m" or more, which is set as the threshold value, and the first latch 231 (leftmost latch) latches the signal $S_{n/8}$. Then, the output of the multiplexer circuit 232 shifts from a low level to a high level.

The signal T1 shifts from a low level to a high level, at the time t5 at which $T/m^2$ has elapsed since the start of the exposure period T. For example, the time t5 is a time at which T/64 has elapsed from the time t1, which is the start time of the exposure period T.

Between the time t4 and the time t5, since the output of the multiplexer circuit 232 is at the high level, when the signal T1 is input at the time t5, the signal TC<1> serving as a time code shifts from a low level to a high level. Thus, "1" is input to the second memory 233. Further, since the signal TC<1> shifts from the low level to the high level, as illustrated in FIG. 10, the signal STOP is provided to the counter 211 and the logic circuit 221 via the logic circuit 234, and the transistor, which is the quench element 202, turns off.

Further, focusing on the signal CLKB, since the total number of pulses in the exposure period T is Nc, at the time t5 at which T/64 has elapsed since the start of the exposure period T, the total number of pulses is Nc/m².

FIG. 11 illustrates the example in which a photon is incident after the elapse of the time t5. In this case, due to an incidence of the photon, an avalanche multiplication occurs, and the potential of VC decreases. However, since the transistor, which is the quench element 202, is kept being off, the avalanche multiplication does not occur again. Thus, the value of VO once shifts from a low level to a high level, and is kept being at the high level.

The signal T2 shifts from a low level to a high level at a time t6 at which T/m has elapsed since the start of the exposure period T. For example, the time t6 is a time at which T/8 has elapsed from the start of the exposure period T. Further, focusing on the signal CLKB, since the total number of pulses in the exposure period T is Nc, at the time t6 at which T/8 has elapsed from the start of the exposure period T, the total number of pulses is Nc/m.

At this time, the output of the multiplexer circuit 232 is kept at the high level. When the signal T2 is input at the time t6, the signal TC<2> serving as a time code shifts from a low level to a high level. Accordingly, "1" is input to the third memory 233.

Since the value of VO is at the high level due to the input of the photons at the time t5 and thereafter, the signal EN is controlled to shift from the high level to the low level so as not to count the high level value of VO. As described above, the signal EN also has a function of defining the start and end of the exposure period T (maximum exposure period). Alternatively, the start and end of the maximum exposure period may be defined using a signal other than the signal EN.

At a time t7, when the read-out signal WRT shifts to a high level, a signal is read out from the memory 223 to the selection circuit 212. Further, at a time t8, when the read-out signal READ shifts to a high level, the signal is output from the selection circuit 212 to the outside of the photoelectric conversion device 100. For example, with the signal WRT, information of all rows is collectively stored in the memory 223, and with the signal READ, the information is read out sequentially for each row. In this way, the global shutter system that starts the exposure period for all the rows collectively can be implemented.

In the present exemplary embodiment, with respect to the exposure period ratio "m", the threshold value for the determination timing is set "Nsat/m". At this time, the threshold value for the count value is generalized to be "Nsat/n" (n is a number of 2 or more). In other words, "Nsat/n" is "(the maximum count value of the counter 211)/n". As employed herein, "the maximum counter value of the counter 211" is a number including the maximum count value of the counter 211 (e.g., 2147) and a value equivalent to the maximum count value of the counter 211 (e.g., 2148).

In this case, if "n" is smaller than "m" that is the exposure period ratio, for example, the number of pixels, of which the count value in the first exposure period does not exceed the threshold value and the count value reaches the saturation value in the second exposure period, can increase, thereby causing loss of gradation under a specific light quantity. In contrast, by setting "n" in "Nsat/n" larger than or equal to "m" that is the exposure period ratio, there is a merit of being able to reduce the number of pixels with the count value thereof reaching the saturation value, and to secure the gradation under a wide range of light quantity conditions from the low brightness to the high brightness.

Figure 12:
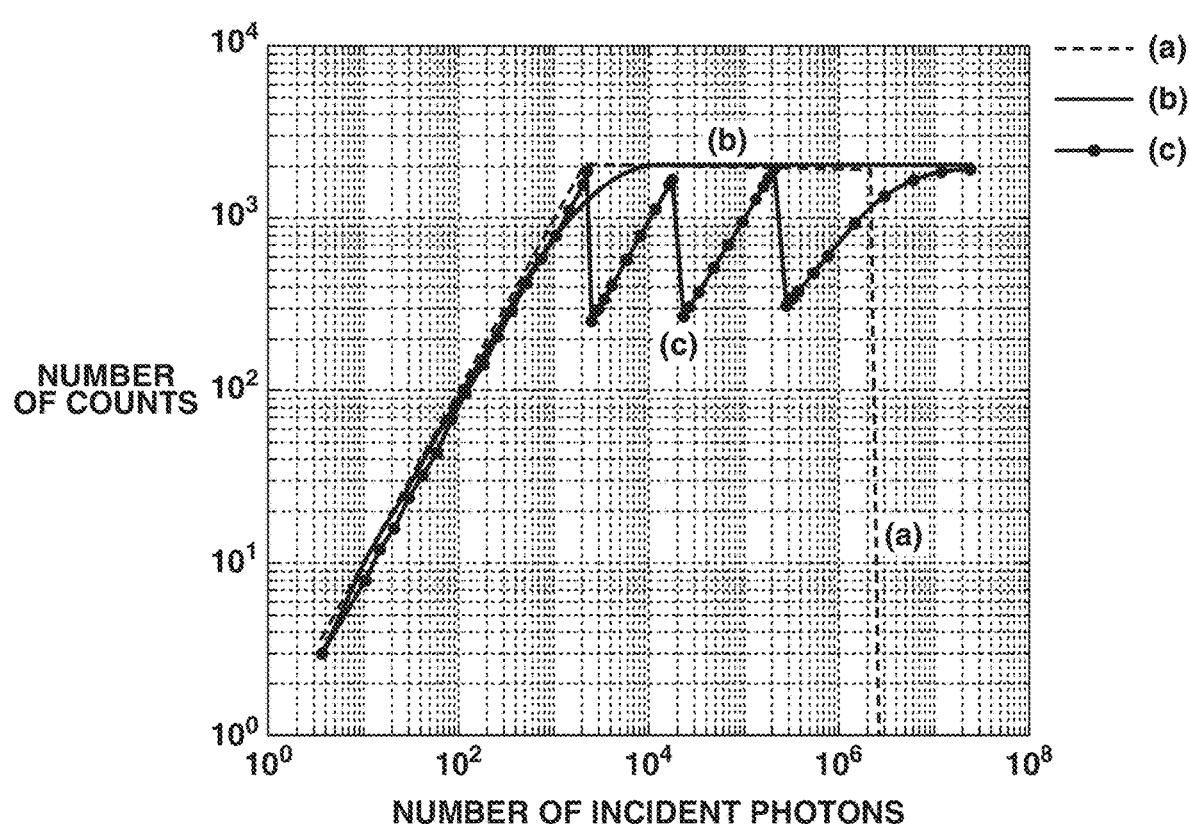
FIG. 12 is a diagram illustrating a relationship between the numbers of incident photons and count values according to each of the comparative examples and the first exemplary embodiment.

FIG. 12 illustrates an effect in the photoelectric conversion device 100 in a configuration illustrated in each of FIGS. 6A, 6B, and 6C. In other words, the concepts described with reference to FIGS. 7A, 7B, and 9A are indicated by specific values. The horizontal axis in FIG. 12 illustrates the number of incident photons, and the vertical axis indicates a median value of the count values. A dotted line (a) corresponds to the configuration of the passive recharge described with reference to FIG. 6A. A solid line (b) with no plots corresponds to the configuration of the clock recharge described with reference to FIG. 6B. A solid line (c) with round plots corresponds to the configuration of controlling the exposure period for each pixel described with reference to FIG. 6C.

The dotted line (a) in FIG. 12 is saturated at a 2047 count, thereafter the number of photons cannot be counted, and thus the count value decreases abruptly. This is because, as described above, when the number of incident photons is extremely large, the voltage of VC is kept low, and no signal is generated because the count value does not exceed the threshold value from the lower side to upper side.

The solid line (b) with no plots in FIG. 12 is saturated at a 2047 count because the recharge clock in one frame is set to be "2048" (Nc=2048), and the maximum count value of the counter 211 is "2047". However, the number of incident photons before reaching the saturation is larger than that of the dotted line (a) in FIG. 12. In a case where the number of incident photons is extremely large, the situation in which no signal is generated does not occur. However, since only the number of clock cycles can be counted, the upper limit of the count value is limited by the clock frequency.

The solid line (c) with round plots in FIG. 12 is obtained by combining the clock recharge and the exposure period control for each pixel, which is one of the exemplary embodiments of the present invention. The upper limit of the count value is "2047", which is the same as those in the dotted line (a) and the solid line (b). However, the solid line (c) indicates that the count value reaches the bottom three times. As described above, since "Nsat/m" is set as the threshold value, the bottom count is "256", in a case of m=8. This method enables the counting to continue even in a case where an incident light quantity is larger than the incident light quantity corresponding to the 2047 count, thereby enabling to expand the dynamic range. More specifically, since the shortest exposure period in which the time code can be output is set to be T/m³ and m=8, there is a merit that the dynamic range is 512 times wider than the case indicated by the solid line (b) in FIG. 12B.

Exemplary Embodiment: Calculation Processing

Figure 13A:
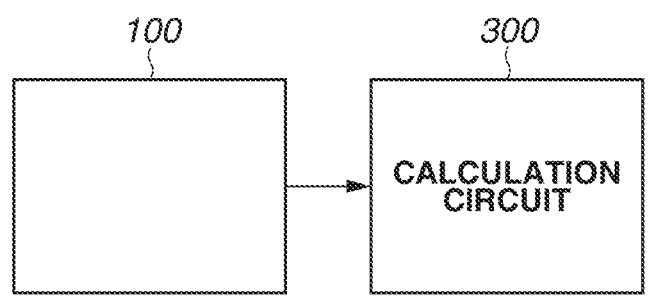
FIGS. 13A and 13B are a block diagram and a flowchart illustrating image reconstruction processing according to the first exemplary embodiment.
Figure 13B:
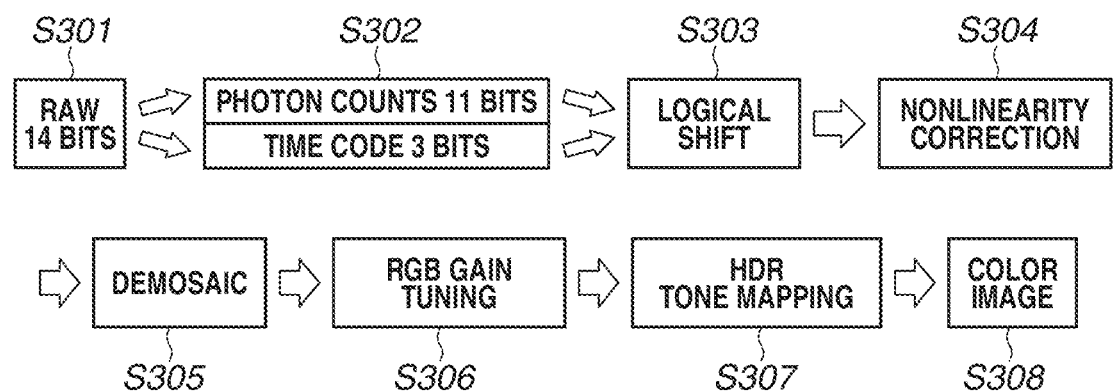

FIGS. 13A and 13B are diagrams respectively illustrating a circuit for performing calculation processing, and the calculation processing.

As illustrated in FIG. 13A, a signal output from the photoelectric conversion device 100 is input to a calculation circuit 300. The calculation circuit 300 may be included in the photoelectric conversion device 100. In addition, the signal may be input to the calculation circuit 300 by wire, wirelessly, or via a recording medium.

FIG. 13B illustrates the calculation processing performed in the calculation circuit 300.

In step S301, 14-bit raw data is read out from the memory 223.

In step S302, count value information of photons corresponding to 11 bits and time code information corresponding to 3 bits are separated from the 14-bit Raw data.

In step S303, using the count value information and the time code information, a logical shift (bit shift) is performed.

Figure 14:
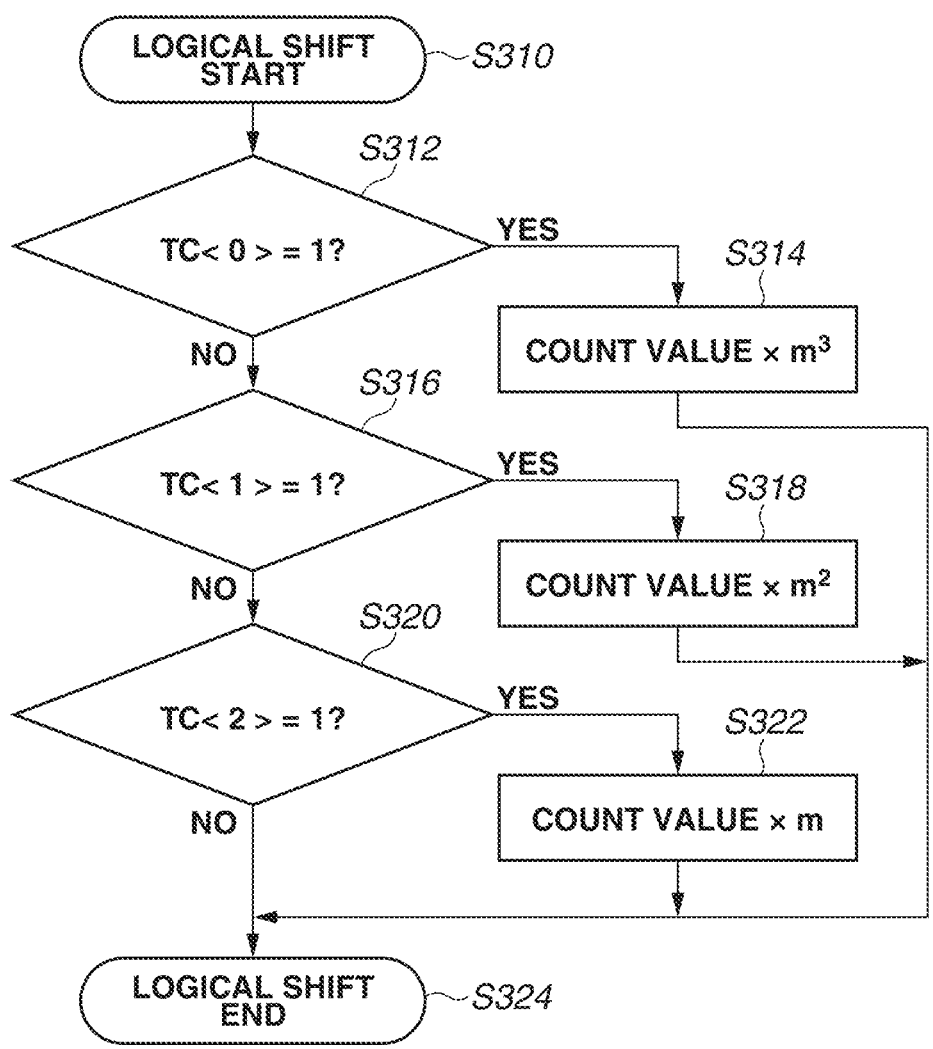
FIG. 14 is a flowchart illustrating the image reconstruction processing according to the first exemplary embodiment.

FIG. 14 illustrates the logical shift processing specifically. In step S310 in FIG. 14, the logical shift starts. In step S312, it is determined whether the time code TC<0> is "1".

In a case where TC<0> is "1" (YES in step S312), the processing proceeds to step S314. In step S314, the photon count value corresponding to 11 bits is multiplied by $m^3$.

In step S312, in a case where the time code TC<0> is not "1" (NO in step S312), the processing proceeds to step S316. In step S316, it is determined whether the time code TC<1> is "1". In a case where TC<1> is "1" (YES in step S316), the processing proceeds to step S318. In step S318, the photon count value corresponding to 11 bits is multiplied by $m^2$. In step S316, in a case where the time code TC<1> is not "1" (NO in step S316), the processing proceeds to step S320. In step S320, it is determined whether the time code TC<2> is "1". In a case where TC<2> is "1" (YES in step S320), the processing proceeds to step S322. In step S322, the photon count value corresponding to 11 bits is multiplied by m. In step S320, in a case where the time code TC<2> is not "1" (NO in step S320), the processing proceeds to step S324. In step S324, since the counter 211 is not saturated, the logical shift processing is not required and the logical shift calculation ends. In this way, in the logical shift processing, the multiplication ratio of the count value of the counter 211 is changed based on the time information.

Referring back to FIG. 13B, in step S304, a nonlinearity correction is performed. For example, with reference to the solid line (c) with round plots in FIG. 12, the inclination of the solid line (c) is not constant around the region where the number of incident photons is $1 \times 10^6$ to $1 \times 10^7$. Thus, in step S304, the correction is performed for this region where the inclination is not constant.

More specifically, assuming that the count value after correction is X, the count value before correction is Y, the relationship between X and Y is expressed as $Y=Nc \times (1-\exp(-X/Nc))$. In this formula, as described above, Nc is the number of pulses countable within the exposure period T. In step S305, demosaic processing (interpolation processing) is performed. In step S306, since light transmission ratios and reflectance ratios of filters of red, green, and blue (RGB) are different from each other, appropriate tuning of each signal gain is performed. In step S307, a high dynamic range (HDR) tone mapping is performed. In step S308, a color image on which the calculation processing is performed is output. In FIG. 13B, the case of outputting a color image is described, but a monochrome image may be output. In this case, it is possible to omit the processing in steps S305 and S306, as appropriate.

Modification Example

In the first exemplary embodiment described above, the description is given of the case where it is determined whether the count value has reached the threshold value at the predetermined check points, and the threshold value is set to be smaller than the maximum count value of the counter 211 (saturation value). However, a configuration can be employed in which the maximum count value of the counter 211 is set as the threshold value, and the counting is performed to the threshold value. In this case, time information about a timing at which the count value has reached the threshold value may be stored in a memory, and a calculated count value may be obtained from the time information using an extrapolation method.

Also in this method, the number of pulses of the clock signal input during the exposure period T is twice or more the maximum count value of the counter 211. For example, assuming that the exposure period T includes the first exposure period and the second exposure period, the number of pulses of the clock signal in the first exposure period is set to the maximum count value of the counter 211 or more. Further, assuming that the first exposure period is shorter than the second exposure period, the number of pulses of the clock signal in the first exposure period may be set to the maximum count value of the counter 211 or more. Further, like the above-described exemplary embodiment, assuming that the number of pulses more than or equal to the maximum count value of the counter 211 is required until $T/m^3$ elapses, if m=2, the number of pulses in the exposure period T is 8 or more times the maximum count value of the counter 211. Further, if m=8, the number of pulses in the exposure period T is 512 or more times the maximum count value of the counter 211.

With reference to FIGS. 15A to 15E, a description will be given of variations of frequency of the pulse signal according to a second exemplary embodiment. FIGS. 15A to 15E illustrates timing charts of the signal CLKB input to the logic circuit 221 described with reference to FIG. 6C.

First Configuration

Figure 15A:
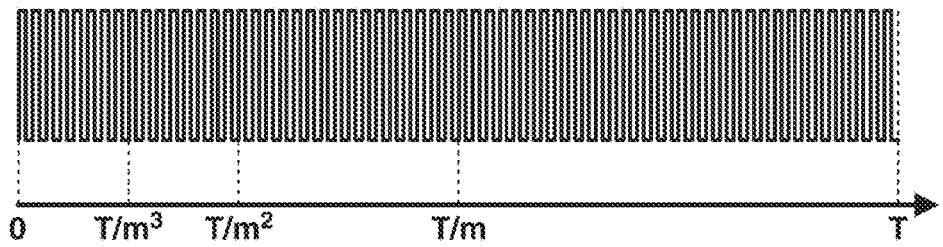
FIGS. 15A to 15E are diagrams each illustrating a clock signal according to a second exemplary embodiment.

FIG. 15A illustrates a configuration, as a first configuration, in which the photoelectric conversion device 100 is operated with a signal CLKB of a constant frequency from the start to the end of the exposure period T. As in the first exemplary embodiment, in the case where the shortest exposure period to determine the count value is $T/m^3$, the number of pulses of the signal CLKB in a period from the start of the exposure period T to $T/m^3$ is, for example, Nsat. In this case, the number of pulses of the signal CLKB countable within the exposure period T is $Nsat \times m^3$. Thus, it is possible to expand the dynamic range using up to the upper count limit by inserting the Nsat times of recharges within the shortest exposure period. Further, the number of pulses of the signal CLKB input in the shortest exposure period to determine the count value needs not be exactly Nsat, and the number of pulses input in the shortest exposure period may be Nsat or more. In other words, the clock signal including the number of pulses corresponding to the maximum count value of the counter 211 or more is only needed.

Second Configuration

Figure 15B:
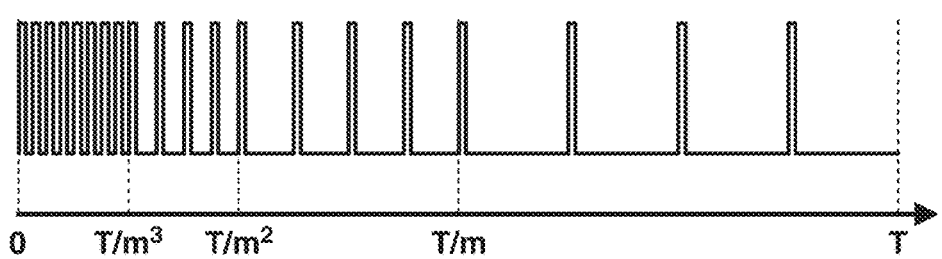

FIG. 15B is a timing chart illustrating a signal CLKB in a second configuration. The second configuration is different from the first configuration in that the frequency of the signal CLKB changes in the exposure period T. In the second configuration, the frequency of the signal CLKB is switched at each of the determination points $T/m^3$, $T/m^2$, and $T/m$, each of which is a timing to determine the count value. In other words, two or more types of frequencies of the clock signal are provided within the exposure period T.

Assume that, for example, the frequency of the signal CLKB from the start of the exposure period T to $T/m^3$ is a frequency f1, the frequency of the signal CLKB from the $T/m^3$ to $T/m^2$ is a frequency f2, the frequency of the signal CLKB from the $T/m^2$ to T/m is a frequency f3, and the frequency of the signal CLKB from T/m to T is a frequency f4. In this case, the relationship of f1>f2>f3>f4 is satisfied. At this time, if m=8, the frequency may decrease depending on the ratios of the exposure periods, like $f1=f2 \times 8=f3 \times$ 64=f4×512. If these ratios are applied, it corresponds to a case where the minimum frequency is set in a case where photons are incident at a predetermined cycle until each determination timing. The minimum frequency is a frequency calculated by dividing the possible maximum number of incident photons Nsat by the period until each determination timing such as $T/m^3$, $T/m^2$, or $T/m$. If the frequency of the signal CLKB is more than or equal to the minimum frequency, the dynamic range can be utilized to the maximum degree up to the upper count limit value Nsat at each determination timing. For example, in a case where the maximum number of incident photons Nsat is assumed until $T/m^3$, the minimum frequency $f1=Nsat/(T/m^3)$.

In the period from $T/m^3$ to $T/m^2$, since the count value has not exceeded the threshold value at the time point $T/m^3$, the maximum incident frequency of the photons corresponds to a case where the count value reaches the count Nsat at the next time point $T/m^2$. In other words, in the period from $T/m^3$ to $T/m^2$, $f2=Nsat/(T/m^2)$ only needs to be satisfied. Calculated in a similar manner, $f3=Nsat/(T/m)$, $f4=Nsat/T$. In this way, consumed power due to the signal CLKB can be reduced while securing the advantage of the dynamic range expansion, by reducing the frequency of the signal CLKB in the exposure period T to leave only the necessary number of pulses.

To change the frequency of the clock signal, a frequency dividing circuit may be provided. The frequency dividing circuit can be provided in a vertical scanning circuit unit, a pixel circuit unit, or a control pulse generation unit. In a case where the frequency dividing circuit is provided in the pixel circuit unit, it is possible to provide a clock signal of a frequency different for each pixel.

In addition, the frequency of the clock signal in the period from the start of the exposure period T to $T/m^3$ (first exposure period) may not be constant. Similarly, the frequency of the clock signal in the period from $T/m^3$ to $T/m^2$ (second exposure period) may not be constant. In this case, an average frequency may be used as the frequency. For example, a first frequency, which is an average frequency in the first exposure period, is larger than a second frequency, which is an average frequency in a second exposure period.

Third Configuration

Figure 15C:
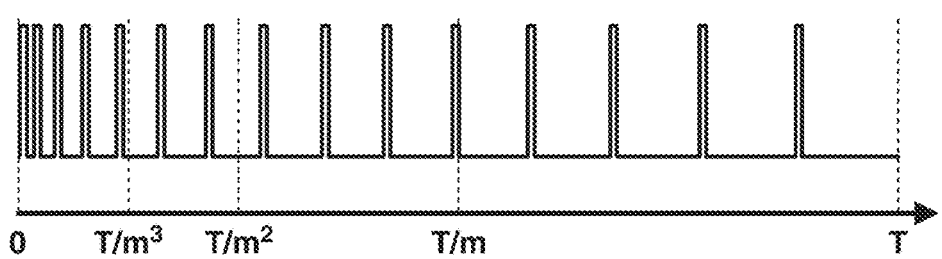

FIG. 15C is a timing chart illustrating a signal CLKB in a third configuration.

The third configuration is different from the second configuration in that the frequency gradually decreases from the start of the exposure period T toward the end of the exposure period T, instead of changing the frequency before and after the timing to determine the count value. In this way, by gradually adjusting the frequency instead of changing the frequency before and after the determination timing, the step of the count values generated by the switching of the frequency can be reduced. Further, options of circuit configurations can be broadened by using, for example, a frequency modulation circuit, in addition to the frequency dividing circuit, as a method of changing the frequency.

In addition, this configuration can be expressed as a configuration in which the average frequency of the clock signal changes in a direction where it gradually reduces from the start of the exposure period T toward the end of the exposure period T. Further, this configuration can also be expressed as a configuration in which the average frequency during a predetermined period before the end of the exposure period T is less than the average frequency during a predetermined period after the start of the exposure period T.

Fourth Configuration

Figure 15D:
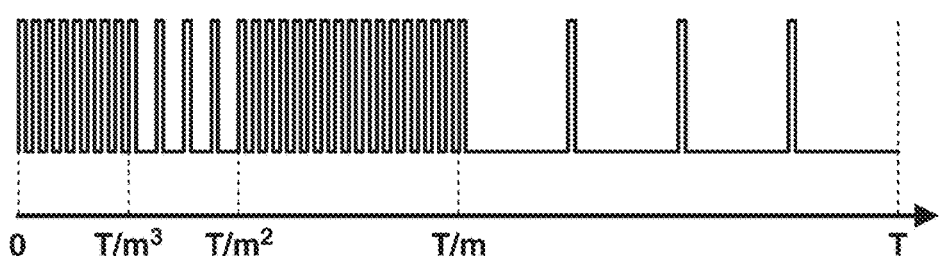

FIG. 15D is a timing chart illustrating a signal CLKB in a fourth configuration. While the frequency of the signal CLKB is constantly changing in the direction where it decreases toward the latter half of the exposure period T in the second configuration illustrated in FIG. 15B, in the fourth configuration, the frequency once becomes high between $T/m^2$ and $T/m$. For example, assume a case where in the period between the start of the exposure period T to the determination timing at $T/m^2$, photons are not incident very frequently, i.e., a low illumination intensity condition, and in a period from the determination timing at $T/m^2$ to the end of the exposure period T, many photons are incident, i.e., a high illumination intensity condition. In this case, if the driving method illustrated in FIG. 15B is employed, photon count loss occurs in a case where the illumination intensity condition changes to the high illumination intensity condition in the latter half. In the driving method illustrated in FIG. 15D, even under such the condition, it is possible to reduce the photon count loss in the latter half. In addition, the increasing ratio of the frequency of the signal CLKB or the timing to increase the frequency can be determined arbitrarily, and any ratio and any timing can be selected only if they satisfy the number of pulses or more necessary to expand the dynamic range.

Fifth Configuration

Figure 15E:
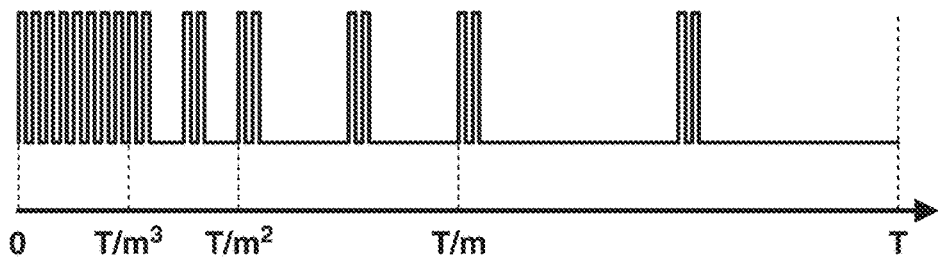

FIG. 15E is a timing chart illustrating a signal CLKB in a fifth configuration. The fifth configuration is different from the second configuration illustrated in FIG. 15B in that intervals between pulses are equal in a group, but distances between the groups gradually increase. However, in FIGS. 15B and 15E, the number of pulses in each exposure period (period defined by the determination timings) is the same. According to the configuration in FIG. 15E, in each exposure period, when the pulses of the signal CLKB come close to each other, it is possible to perform counting even in a case where the incident timings of photons become close to each other. Thus, since the photoelectric conversion device 100 can have a sensitivity up to the high illumination intensity, the dynamic range thereof can be expanded.

In addition, the fifth configuration can be expressed as a configuration in which the number of pulses of the clock signal per unit time in the first exposure period is more than that in the second exposure period. In other words, the pulse distribution ratio of the clock signal in the first exposure period is denser than that in the second exposure period.

Figure 16:
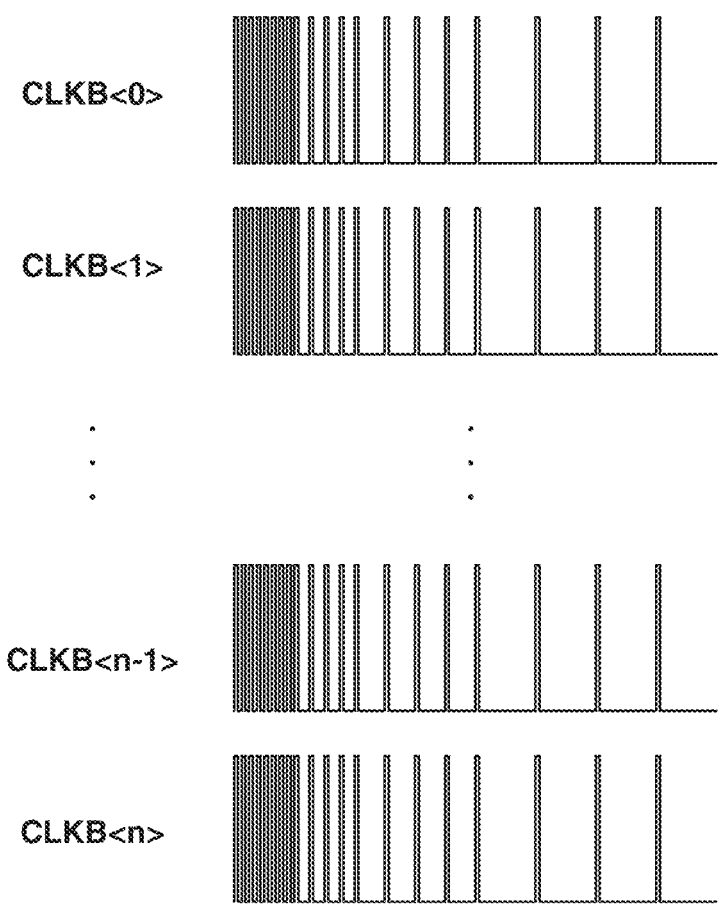
FIG. 16 is a diagram illustrating clock signals according to a third exemplary embodiment.
Figure 17:
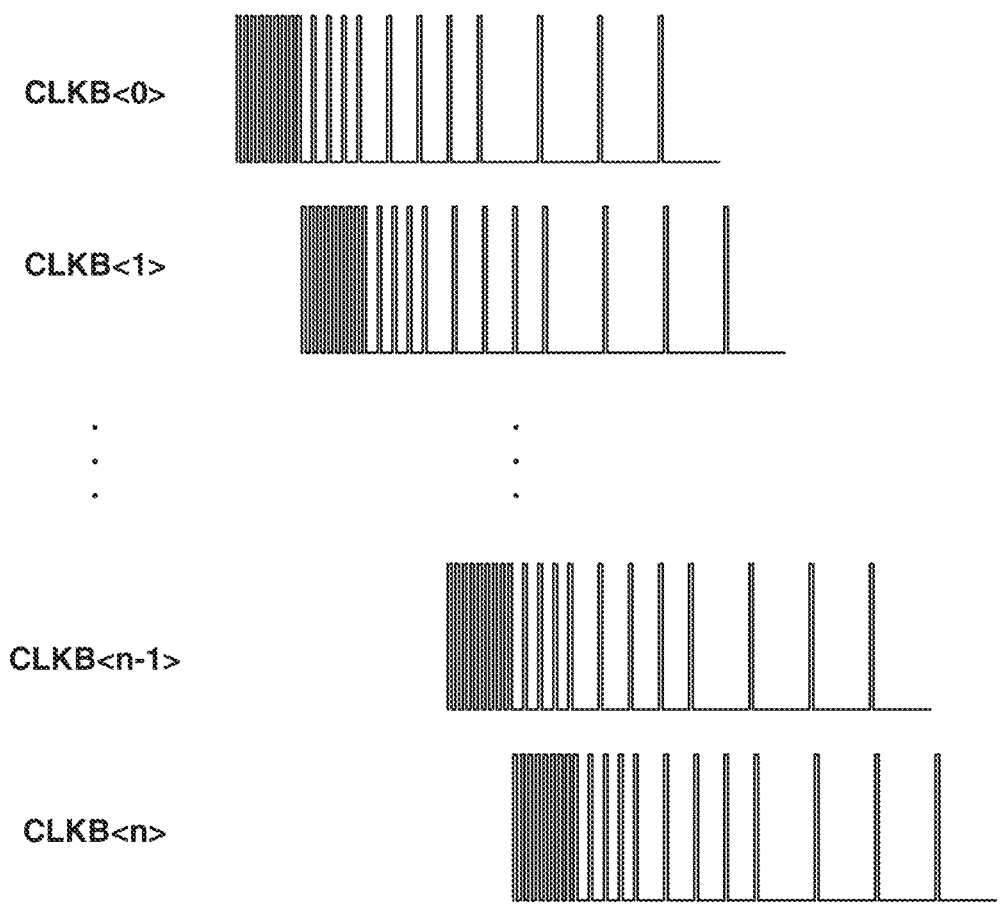
FIG. 17 is a diagram illustrating clock signals according to the third exemplary embodiment.

With reference to FIGS. 16 and 17, a description will be given of variations of an input method of inputting the pulse signal according to a third exemplary embodiment. FIGS. 16 and 17 are timing charts each illustrating signals CLKB input to the logic circuit 221 described with reference to FIG. 6C.

In FIG. 16, the signals CLKB, i.e., CLKB<0>, CLKB<1>, . . . , CLKB<n−1>, and CLKB<n> are input corresponding to respective vertical scan addresses 0, 1, . . . , n−1, and n. It is possible to control the frequency to change for an exposure period for each vertical scan address in a plurality of rows, in a global shutter driving method. In this case, any method for controlling the frequency for each vertical address can be employed. For example, a configuration in which signals with various frequencies are input to the vertical scan circuit unit 110 from the control pulse generation unit 115 and a frequency is selected for each address in the vertical scan circuit unit 110, is conceivable. Alternatively, a signal with a single frequency may be input to the vertical scan circuit unit 110 and may be divided in the middle of the exposure period for each vertical scan address. Further alternatively, a signal with a constant frequency may be input from the vertical scan circuit unit 110, and may be divided in the signal processing unit 103 for each pixel.

FIG. 17 is an example illustrating another driving method, and is different from FIG. 16 in that the driving method is not the global shutter driving method but a rolling shutter driving method. By performing the frequency control for each address in this way, the photoelectric conversion device 100 can be driven in any of the driving methods.

Figure 18:
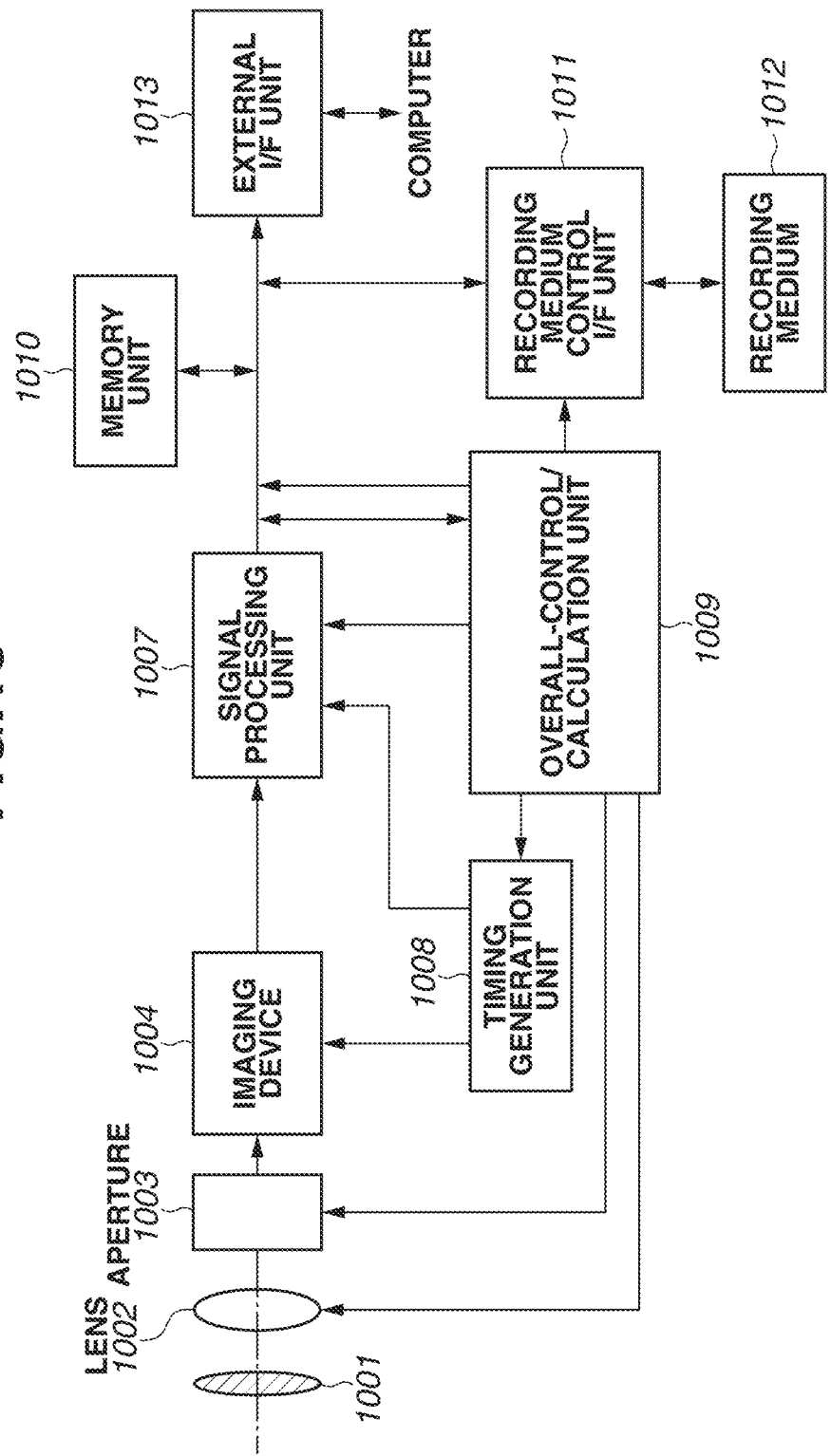
FIG. 18 is a block diagram illustrating a photoelectric conversion system according to a fourth exemplary embodiment.

A photoelectric conversion system according to a fourth exemplary embodiment will be described with reference to FIG. 18. FIG. 18 is a block diagram schematically illustrating a photoelectric conversion system according to the present exemplary embodiment.

The photoelectric conversion devices described in the above exemplary embodiments are applicable to various photoelectric conversion systems. Examples of the applicable photoelectric conversion systems include digital still cameras, digital camcorders, monitoring cameras, copying machines, facsimile machines, portable telephones, car-mounted cameras, and observation satellites.

Further, a camera module including an imaging device and an optical system such as a lens is included in the photoelectric conversion system. FIG. 18 is a block diagram illustrating a digital still camera as an example.

The photoelectric conversion system illustrated in FIG. 18 as an example includes an imaging device 1004 as an example of the photoelectric conversion device 100 and a lens 1002 for focusing an optical image of an object on the imaging device 1004. The photoelectric conversion system further includes an aperture 1003 for varying an amount of light passing through the lens 1002, and a barrier 1001 for protecting the lens 1002. The lens 1002 and the aperture 1003 are included in the optical system for focusing light on the imaging device 1004. The imaging device 1004 is one of the photoelectric conversion devices 100 according to the exemplary embodiments described above, and converts an optical image focused by the lens 1002 into an electrical signal.

The photoelectric conversion system also includes a signal processing unit 1007 serving as an image generation unit for generating an image by processing an output signal output from the imaging device 1004. The signal processing unit 1007 performs an operation of outputting image data after performing various kinds of corrections and compressions thereon if needed. The signal processing unit 1007 may be formed on a semiconductor layer on which the imaging device 1004 is provided, or may be formed on another semiconductor layer different from the semiconductor layer on which the imaging device 1004 is provided. Further, the imaging device 1004 and the signal processing unit 1007 may be formed on the same semiconductor layer.

The photoelectric conversion system further includes a memory unit 1010 for temporarily storing image data, and an external interface (I/F) unit 1013 for communicating with an external computer and the like. The photoelectric conversion system further includes a recording medium 1012 such as a semiconductor memory used for recording imaging data thereinto and reading imaging data therefrom, and a recording medium control I/F unit 1011 for recording data into and reading data from the recording medium 1012. The recording medium 1012 may be built in the photoelectric conversion system or may be attachable to and detachable from the photoelectric conversion system.

Further, the photoelectric conversion system includes an overall-control/calculation unit 1009 for controlling various calculations and controlling the entire photoelectric conversion system (digital camera), and a timing generation unit 1008 for outputting various timing signals to the imaging device 1004 and the signal processing unit 1007. In the present exemplary embodiment, the timing signals may be input from the outside, and the photoelectric conversion system only needs to include at least the imaging device 1004 and the signal processing unit 1007 for processing the output signal output from the imaging device 1004.

The imaging device 1004 outputs an image signal to the signal processing unit 1007. The signal processing unit 1007 performs predetermined signal processing on the image signal output from the imaging device 1004, and outputs the resultant image data. The signal processing unit 1007 generates an image using the image signal.

In such a manner, according to the present exemplary embodiment, the photoelectric conversion system to which the photoelectric conversion device 100 (imaging device) according to any of the exemplary embodiments described above is applied can be implemented.

Figure 19A:
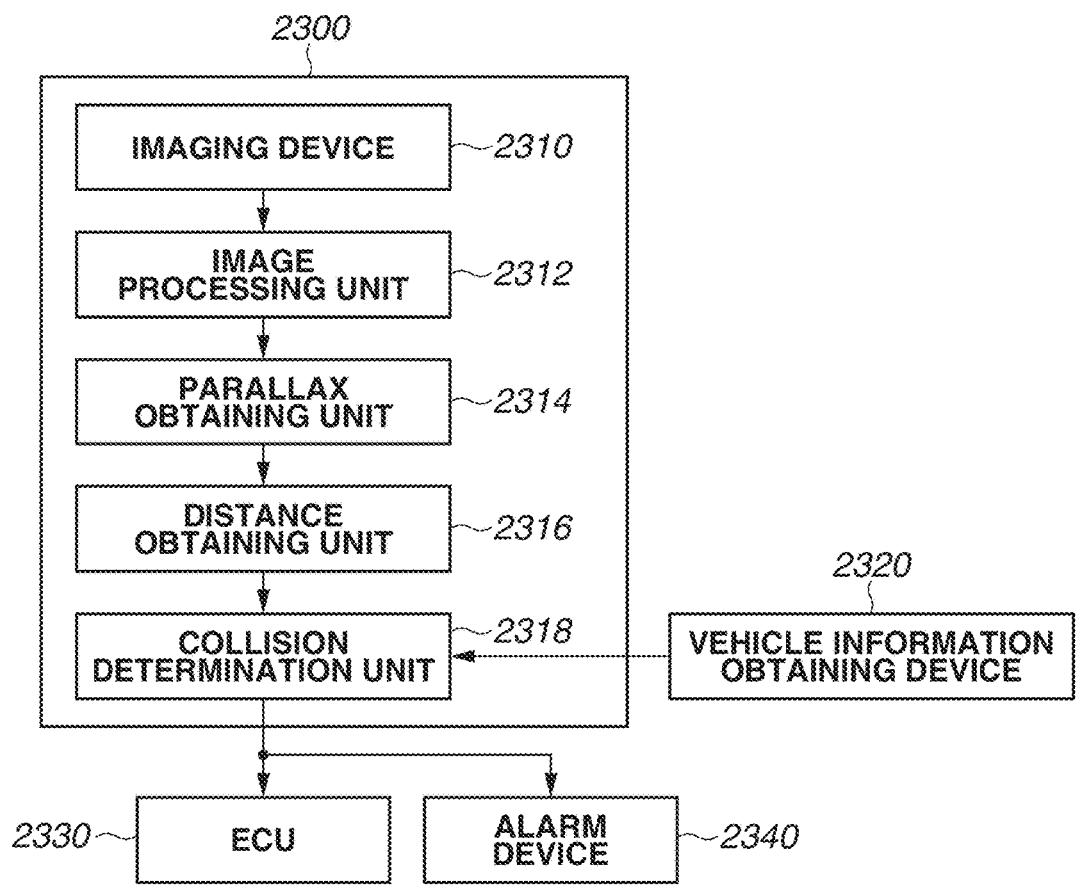
FIGS. 19A and 19B are block diagrams illustrating a photoelectric conversion system according to a fifth exemplary embodiment.
Figure 19B:
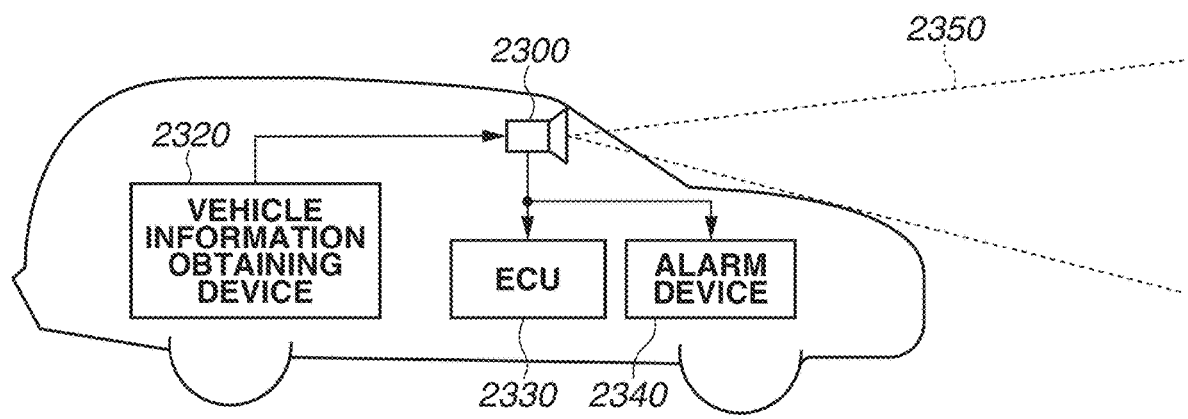

A photoelectric conversion system and a moving body according to a fifth exemplary embodiment will be described with reference to FIGS. 19A and 19B. FIGS. 19A and 19B are block diagrams respectively illustrating a photoelectric conversion system 2300 and a moving body according to the present exemplary embodiment.

FIG. 19A illustrates an example of the photoelectric conversion system 2300 related to a car-mounted camera. The photoelectric conversion system 2300 includes an imaging device 2310. The imaging device 2310 is any of the photoelectric conversion devices according to the exemplary embodiments described above. The photoelectric conversion system 2300 includes an image processing unit 2312 for performing image processing on a plurality of pieces of image data obtained by the imaging device 2310. Further, the photoelectric conversion system 2300 includes a parallax obtaining unit 2314 for calculating parallax (i.e., phase difference between parallax images) from a plurality of pieces of image data obtained by the photoelectric conversion system 2300. Further, the photoelectric conversion system 2300 includes a distance obtaining unit 2316 for calculating a distance to an object based on the calculated parallax, and a collision determination unit 2318 for determining whether there is a possibility of collision based on the calculated distance. In the present exemplary embodiment, each of the parallax obtaining unit 2314 and the distance obtaining unit 2316 is an example of a distance information obtaining unit for obtaining the distance information about the object. In other words, the distance information is information related to a parallax, a defocus amount, a distance to an object, and the like. The collision determination unit 2318 may determine the possibility of collision using any of the pieces of distance information. The distance information obtaining unit may be implemented by using exclusively designed hardware components, or software modules. Further, the distance information obtaining unit may be implemented by a Field Programmable Gate Array (FPGA), an Application Specific Integrated Circuit (ASIC), or a combination of these components.

The photoelectric conversion system 2300 is connected to a vehicle information obtaining device 2320, and the photoelectric conversion system 2300 can obtain vehicle information such as a vehicle speed, a yaw rate, and a steering angle. Further, an electronic control unit (ECU) 2330 for vehicle control is connected to the photoelectric conversion system 2300. The ECU 2330 is a control device (control unit) configured to output a control signal for generating a braking force to the vehicle based on the result of determination by the collision determination unit 2318. Further, the photoelectric conversion system 2300 is connected to an alarm device 2340 configured to output an alarm to a driver of the vehicle based on the determination result by the collision determination unit 2318. For example, in a case where the possibility of collision is high as a result of the determination made by the collision determination unit 2318, the ECU 2330 performs vehicle control to avoid collision or reduce damage by braking, releasing an accelerator pedal, or restraining an output engine power.

The alarm device 2340 gives a warning to a user by giving an alarm by a sound or the like, displaying alarming information on a screen of a car navigation system, or giving a vibration to a sheet belt or a steering wheel.

In the present exemplary embodiment, the photoelectric conversion system 2300 captures an image around the vehicle, for example, on the front side or the back side of the vehicle. FIG. 19B illustrates the photoelectric conversion system 2300 configured to capture an image on the front side of the vehicle (with an imaging range 2350). The vehicle information obtaining device 2320 transmits instructions to the photoelectric conversion system 2300 or the imaging device 2310. With this configuration, it is possible to enhance the accuracy of the distance measurement.

In the above-described exemplary embodiment, an example in which the photoelectric conversion system performs control to avoid a vehicle from colliding with another vehicle is described. The photoelectric conversion system is also applicable to a case of controlling a vehicle to perform automatic driving to follow another vehicle, or to perform automatic driving not to run out of a traffic lane. Further, the photoelectric conversion system is applicable to moving bodies (moving apparatuses) such as ships, aircrafts, and industrial robots, in addition to the vehicles such as a car. In addition, it is not limited to the moving bodies, and the photoelectric conversion system is widely applicable to apparatuses that use an object recognition, such as an intelligent transportation system (ITS).

Figure 20:
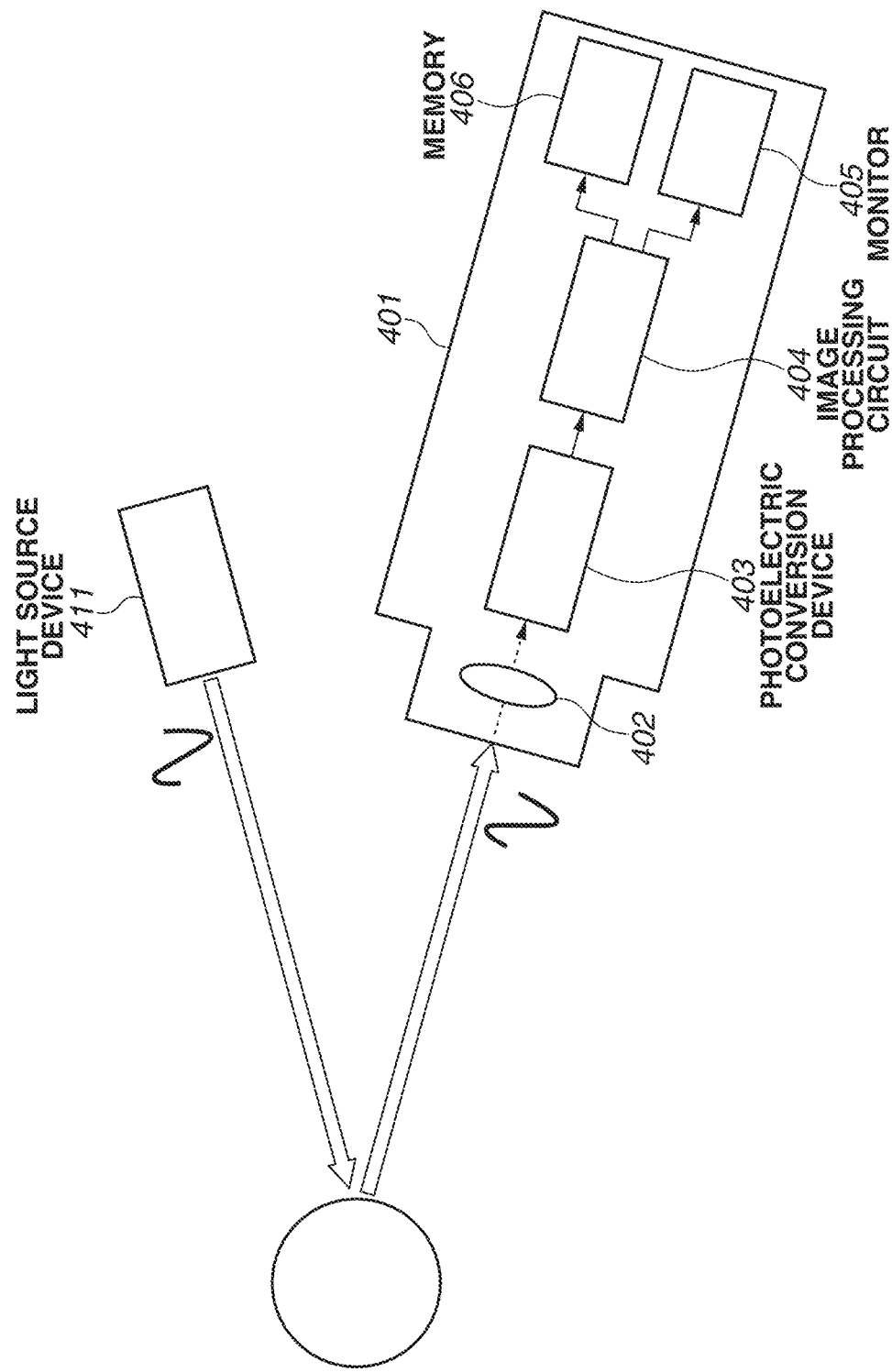
FIG. 20 is a block diagram illustrating a photoelectric conversion system according to a sixth exemplary embodiment.

A photoelectric conversion system according to a sixth exemplary embodiment will be described with reference to FIG. 20. FIG. 20 is a block diagram illustrating a configuration of a range image sensor 401, which is a photoelectric conversion system.

As illustrated in FIG. 20, the range image sensor 401 includes an optical system 402, a photoelectric conversion device 403, an image processing circuit 404, a monitor 405, and a memory 406. The range image sensor 401 can obtain a range image corresponding to a distance to an object, by receiving light (modulated light or pulsed light) emitted from a light source device 411 to an object and reflected on the surface of the object.

The optical system 402 includes one or more lenses, and guides image light (incident light) from the object to the photoelectric conversion device 403 to focus the image light on a light receiving surface (sensor portion) of the photoelectric conversion device 403.

Any of the photoelectric conversion devices according to the exemplary embodiments described above is applicable as the photoelectric conversion device 403, and a distance signal indicating a distance obtained from the light receiving signal output from the photoelectric conversion device 403 is supplied to the image processing circuit 404.

The image processing circuit 404 performs image processing for constructing a range image based on the distance signal supplied from the photoelectric conversion device 403. Then, the range image (image data) obtained through the image processing is supplied to the monitor 405 to be displayed, or is supplied to the memory 406 to be stored (recorded).

The range image sensor 401 configured as described above can obtain, for example, a more accurate range image due to the improvement of the characteristics of the pixels obtained by applying the above-described photoelectric conversion device 403 to the range image sensor 401.

Figure 21:
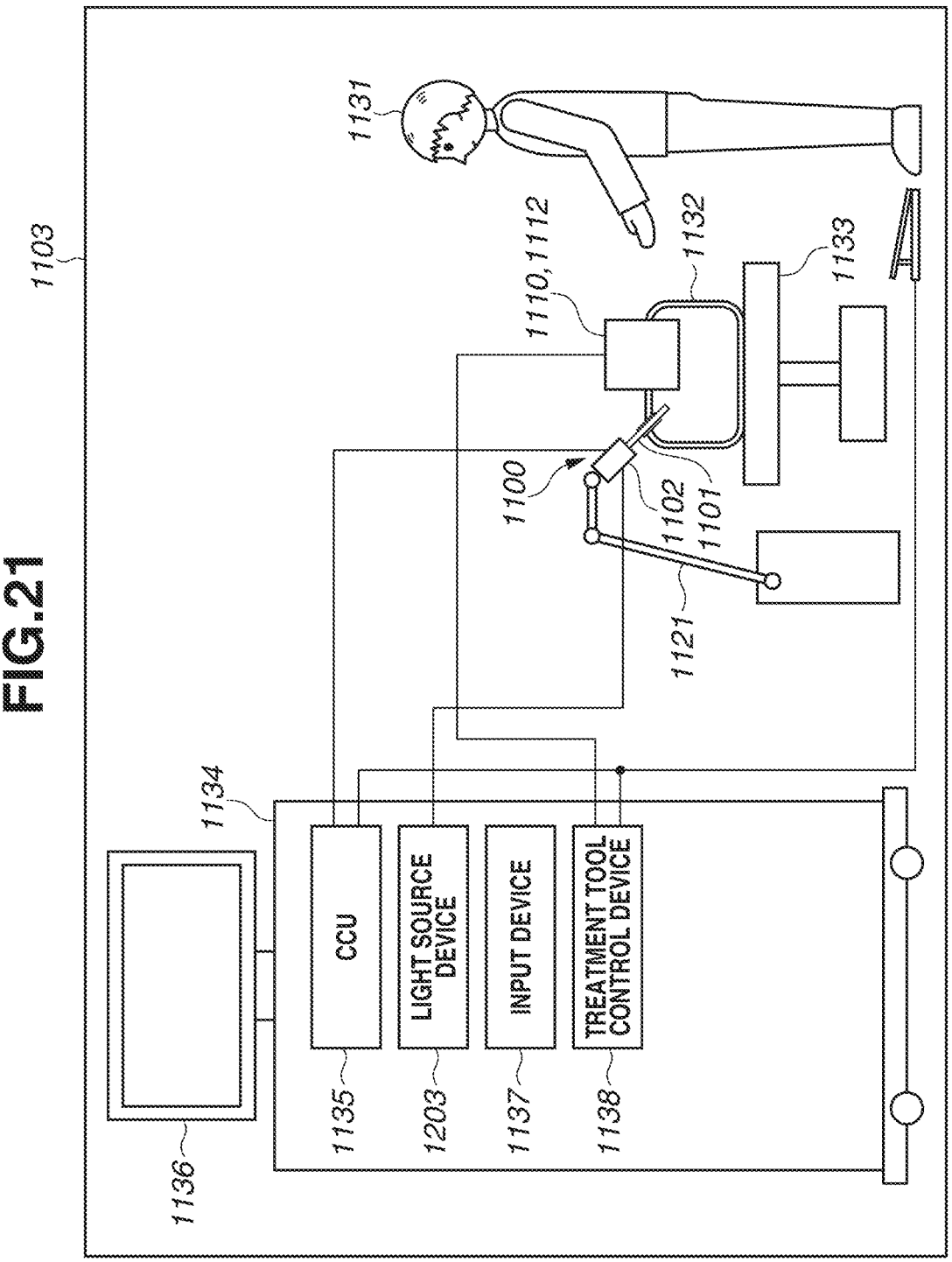
FIG. 21 is a block diagram illustrating a photoelectric conversion system according to a seventh exemplary embodiment.

A photoelectric conversion system according to a seventh exemplary embodiment will be described with reference to FIG. 21. FIG. 21 is a block diagram schematically illustrating an example configuration of an endoscopic operation system 1103, which is a photoelectric conversion system, according to the present exemplary embodiment.

FIG. 21 illustrates a state in which an operator (doctor) 1131 is performing a surgical operation on a patient 1132 lying on a patient bed 1133 using the endoscopic operation system 1103. As illustrated in FIG. 21, the endoscopic operation system 1103 includes an endoscope 1100, a surgical tool 1110, and a cart 1134 on which various devices to be used for the endoscopic operation are placed.

The endoscope 1100 includes a barrel 1101 and a camera head 1102. A predetermined length area from a leading edge of the barrel 1101 is inserted into a body cavity of the patient 1132. The camera head 1102 is connected to a base end of the barrel 1101. In the example in FIG. 21, the endoscope 1100 with the rigid barrel 1101, called a rigid scope, is illustrated, but the endoscope 1100 may be configured as a flexible scope with a flexible barrel.

An opening portion with an objective lens being fit therein is provided at the leading edge of the barrel 1101. A light source device 1203 is connected to the endoscope 1100, and light generated by the light source device 1203 is guided to the leading edge of the barrel 1101 through a light guide extending through the inside of the barrel 1101, and radiated to an observation target in the body cavity of the patient 1132 via the objective lens. In addition, the endoscope 1100 may be a forward-viewing endoscope, an oblique-viewing endoscope, or a side-viewing endoscope.

The camera head 1102 includes an optical system and a photoelectric conversion device, and light (observation light) reflected from the observation target is focused on the photoelectric conversion device by the optical system. The photoelectric conversion device photoelectrically converts the observation light to generate an electrical signal corresponding to the observation light, i.e., an image signal corresponding to the observation image. Any of the photoelectric conversion devices described above in the exemplary embodiments can be used as the photoelectric conversion device. The image signal is transmitted as raw data to a camera control unit (CCU) 1135.

The CCU 1135 is configured by a Central Processing Unit (CPU) and a Graphics Processing Unit (GPU), and collectively controls operations of the endoscope 1100 and a display device 1136. Further, the CCU 1135 receives the image signal from the camera head 1102, and performs various kinds of image processing, such as development processing (demosaic processing), on the image signal to display an image based on the image signal.

Controlled by the CCU 1135, the display device 1136 displays the image based on the image signal having subjected to the image processing by the CCU 1135.

The light source device 1203 is configured by a light source such as a Light Emitting Diode (LED), and supplies to the endoscope 1100 irradiation light to be used when an image of an operation site is captured.

An input device 1137 is an input interface of the endoscopic operation system 1103. A user can input various kinds of information and instructions to the endoscopic operation system 1103 via the input device 1137.

A treatment tool control device 1138 controls driving of an energy treatment tool 1112 used for tissue cauterization, dissection, or sealing of a blood vessel.

The light source device 1203 for supplying to the endoscope 1100 irradiation light to capture an image of an operation site can be configured by a white light source configured by, for example, LEDs, laser light sources, or the combination thereof. In a case where the white light source is configured by a combination of RGB laser light sources, a white balance of the captured image can be adjusted by the light source device 1203, because the output intensity and output timing of each color (each wavelength) can be controlled with a high degree of accuracy. In this case, an image corresponding to each of red, green, and blue can be captured in a time division manner, by each of the RGB laser light sources irradiating the observation object with the laser light in a time division manner, and by controlling the driving of the image sensor of the camera head 1102 in synchronization with the irradiation timing. With this method, even if color filters are not provided on the image sensor, a color image can be obtained.

Further, the driving of the light source device 1203 may be controlled in such a manner that the intensity of the output light is changed at a predetermined time interval. An image with a high dynamic range without underexposure and overexposure can be generated by controlling the driving of the image sensor of the camera head 1102 in synchronization with the light intensity change timings to obtain images in a time division manner and combining the obtained images.

Further, the light source device 1203 may be configured to supply light in a predetermined wavelength range usable for a special light observation. In the special light observation, for example, a wavelength dependency on light absorption of body tissues is used. More specifically, an image of predetermined tissues such as a blood vessel in the superficial portion of the mucous membrane can be captured in high contrast by radiating light with a narrow band narrower than that of the irradiation light (white light) for a usual observation.

Alternatively, a fluorescent observation may be performed in the special light observation. The fluorescent observation obtains an image by fluorescence generated by radiating excitation light. The fluorescent observation enables observing fluorescence obtained by irradiating body tissues with the excitation light, or obtaining an fluorescent image by locally injecting a test reagent such as indocyanine green (ICG) in the body tissues and irradiating the body tissues with the excitation light having the fluorescence wavelength corresponding to the fluorescence wavelength of the test reagent. The light source device 1203 can be configured to supply narrow-band light and/or excitation light usable for the special light observation.

Figure 22A:
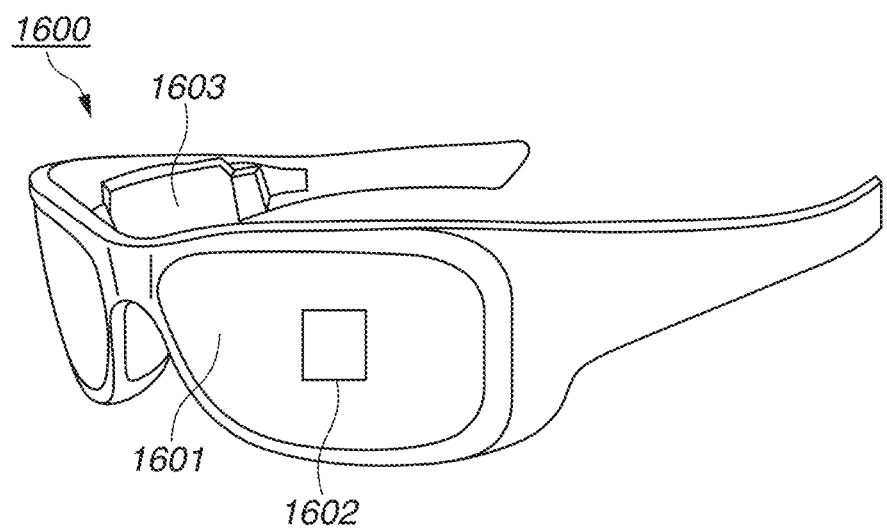
FIGS. 22A and 22B are diagrams each illustrating a specific example of a photoelectric conversion system according to an eighth exemplary embodiment.

A photoelectric conversion system according to an eighth exemplary embodiment will be described with reference to FIGS. 22A and 22B. FIG. 22A is an example configuration illustrating a pair of eye glasses 1600 (smart glasses), which is a photoelectric conversion system.

The pair of eye glasses 1600 includes a photoelectric conversion device 1602. The photoelectric conversion device 1602 is the photoelectric conversion device described in any of the above-described exemplary embodiments. Further, a display device, including a light emitting device such as organic LEDs (OLEDs) or LEDs, may be provided on the back side of a lens 1601. One or a plurality of photoelectric conversion devices 1602 may be provided. Further, a plurality of types of photoelectric conversion devices 1602 may be used in combination. The arrangement position of the photoelectric conversion device 1602 is not limited to that illustrated in FIG. 22A.

The pair of eye glasses 1600 further includes a control device 1603. The control device 1603 functions as a power source to supply power to the photoelectric conversion device 1602 and the above-described display device. Further, the control device 1603 controls operations of the photoelectric conversion device 1602 and the display device. In the lens 1601, an optical system is formed to condense light on the photoelectric conversion device 1602.

Figure 22B:
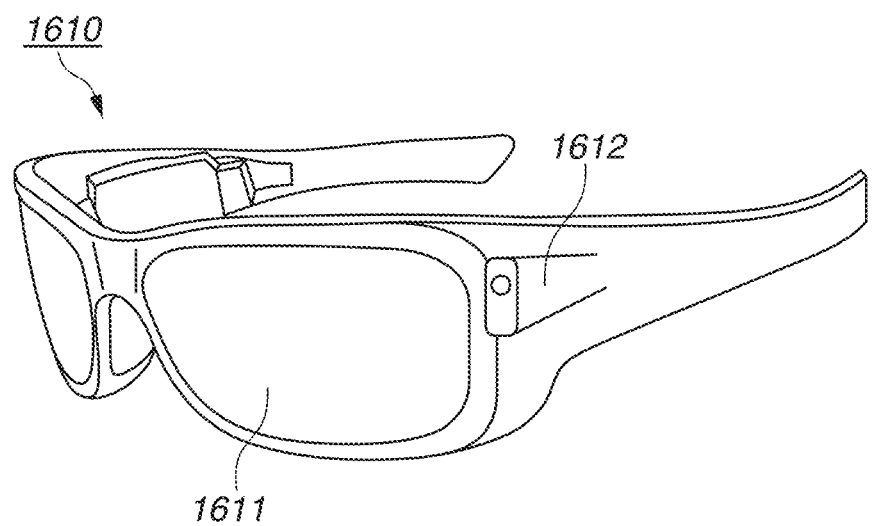

FIG. 22B illustrates a pair of glasses 1610 (smart glasses) according to an application example. The pair of glasses 1610 includes a control device 1612, and a photoelectric conversion device corresponding to the photoelectric conversion device 1602 and a display device are mounted on the control device 1612. In a lens 1611, an optical system for guiding light to the photoelectric conversion device in the control device 1612 and an optical system for projecting light from the display device are formed to project an image on the lens 1611. The control device 1612 functions as a power source to supply power to the photoelectric conversion device and the display device, and also controls operations of the photoelectric conversion device and the display device. The control device 1612 may include a line-of-sight detection unit for detecting a line of sight of the wearer. Infrared light may be used for the line-of-sight detection. An infrared light emission unit emits infrared light to a user's eyeball gazing at a displayed image. A captured image of the user's eyeball is obtained by the imaging unit including light receiving elements for detecting the reflected light of the infrared light emitted to the user's eyeball and reflected therefrom. The deterioration of the image quality is reduced by including a reduction unit for reducing light leaking from the infrared light emitting unit to a display unit in a planar view.

The user's line of sight with respect to the displayed image is detected from the captured image of the eyeball obtained from the infrared image capturing. Any known technique can be used for detecting the line of sight using the captured image of the eyeball. As an example, a line-of-sight detection method based on a Purkinje image formed by the reflected light of the emitted light at a cornea can be used.

More specifically, line-of-sight detection processing based on the pupil corneal reflection method is performed. The user's line of sight is detected by calculating a line-of-sight vector indicating a direction of an eyeball (rotational angle) based on a Purkinje image and an image of a pupil included in the captured image of the eyeball, using the pupil corneal reflection method.

The display device according to the present exemplary embodiment may include a photoelectric conversion device including light receiving elements, and may control a display image to be displayed on the display device based on the user's line-of-sight information obtained from the photoelectric conversion device.

More specifically, a first field of view area at which a user is gazing, and a second field of view area, which is other than the first field of view area, are determined by the display device based on the line-of-sight information. The first field of view area and the second field of view area may be determined by the control device of the display device, or the display device may receive those determined by an external control device. In the display area of the display device, the display resolution of the first field of view area may be controlled to be higher than that of the second field of view area. In other words, the resolution of the second field of view area may be controlled to be lower than that of the first field of view area.

Further, the display area may include a first display area and a second display area different from the first display area, and a high-priority area may be determined from the first display area and the second display area based on the line-of-sight information. The first display area and the second display area may be determined by the control device of the display device, or the display device may receive those determined by an external control device. The resolution of the high-priority area may be controlled to be higher than that of an area different from the high-priority area. In other words, the resolution of the relatively low priority area may be controlled to be lower.

In addition, artificial intelligence (AI) may be used to determine the first field of view area or a high-priority area. The AI may be a model configured to estimate an angle of a line of sight and a distance to a target object positioned in a line-of-sight direction from an image of an eyeball by using images of eyeballs and directions in which the eyeballs are actually gazing at as supervised data. An AI program may be included in the display device, the photoelectric conversion device, or the external device. In a case where the external device includes the AI program, the estimation result is transmitted to the display device through communication.

In a case where the display control is performed based on the line-of-sight detection, the display control can be desirably applied to the smart glasses further including a photoelectric conversion device for capturing an external object. The smart glasses can display the captured external information on a real-time basis.

The exemplary embodiments described above can be appropriately modified without departing from the spirit and scope of the technological idea of the present invention. Further, an example in which a part of the configuration in an exemplary embodiment is added to another exemplary embodiment, and an example in which a part of the configuration in an exemplary embodiment is replaced with a part of the configuration in another exemplary embodiment are also included in the exemplary embodiments according to the present invention.

In addition, the disclosure of the present exemplary embodiment includes the following configurations and methods.

Configuration 1

A photoelectric conversion device comprising a photodiode configured to perform avalanche multiplication, a circuit provided between the photodiode and a power source and configured to switch between a first state in which the photodiode is electrically connected with the power source and a second state in which the photodiode is not electrically connected with the power source, a counter configured to count an output signal output from the photodiode, and a memory into which time information indicating that a count value of the counter has reached a threshold value within a predetermined exposure period is written, the predetermined exposure period being included in an exposure period and shorter than the exposure period, wherein a clock signal is configured to be input to the circuit in the exposure period.

Configuration 2

The photoelectric conversion device according to the configuration 1, wherein the predetermined exposure period includes a first exposure period and a second exposure period.

Configuration 3

The photoelectric conversion device according to the configuration 2, wherein the first exposure period is shorter than the second exposure period, and the number of pulses of the clock signal in the first exposure period is equal to or greater than a maximum count value of the counter.

Configuration 4

The photoelectric conversion device according to any one of the configurations 1 to 3, wherein the threshold value is the maximum count value of the counter.

Configuration 5

The photoelectric conversion device according to any one of the configurations 1 to 3, wherein the threshold value is less than the maximum count value of the counter.

Configuration 6

The photoelectric conversion device according to any one of the configurations 1 to 3, wherein the threshold value is the maximum count value of the counter/n.

Configuration 7

The photoelectric conversion device according to the configuration 6, wherein the predetermined exposure period includes a first exposure period and a second exposure period longer than the first exposure period, and wherein the n is equal to or greater than a value of a length of the second exposure period/a length of the first exposure period.

Configuration 8

The photoelectric conversion device according to the configuration 2, wherein a length of the second exposure period is twice or more a length of the first exposure period.

Configuration 9

The photoelectric conversion device according to any one of the configurations 2 to 8, wherein the predetermined exposure period includes a third exposure period longer than the second exposure period, and a length of the third exposure period is twice or more a length of the second exposure period.

Configuration 10

The photoelectric conversion device according to the configuration 2, 8 or 9, wherein the predetermined exposure period includes a third exposure period longer than the second exposure period, wherein a length of the third exposure period is four or more times a length of the second exposure period, and wherein the length of the second exposure period is four or more times a length of the first exposure period.

Configuration 11

The photoelectric conversion device according to any one of the configurations 1 to 10, further comprising a control circuit configured to change, in a case where the counter has reached the threshold value within the predetermined exposure period, a potential to be supplied to a gate of a transistor included in the circuit.

Configuration 12

The photoelectric conversion device according to any one of the configurations 1 to 11, further comprising a control circuit configured to stop the counter, in a case where the counter has reached the threshold value within the predetermined exposure period.

Configuration 13

The photoelectric conversion device according to any one of the configurations 1 to 12, wherein the number of bits of the memory is less than that of the counter.

Configuration 14

The photoelectric conversion device according to any one of the configurations 1 to 13, further comprising a logic circuit between the photodiode and the counter, wherein the clock signal is input to the logic circuit in the exposure period.

Configuration 15

The photoelectric conversion device according to any one of the configurations 1 to 14, wherein the clock signal has two or more different frequencies in the exposure period.

Configuration 16

The photoelectric conversion device according to the configuration 2, wherein a first frequency that is an average frequency of the clock signal in the first exposure period and a second frequency that is an average frequency of the clock signal in the second exposure period are different from each other.

Configuration 17

The photoelectric conversion device according to the configuration 16, wherein the first frequency is higher than the second frequency.

Configuration 18

The photoelectric conversion device according to the configuration 2, wherein the number of pulses of the clock signal per unit time in the first exposure period is more than that in the second exposure period.

Configuration 19

A calculation circuit configured to calculate a signal output from the photoelectric conversion device according to any one of the configurations 1 to 18, wherein the calculation circuit changes a multiplication rate of a count value of the counter based on the time information.

Configuration 20

The photoelectric conversion device according to the configuration 1, further comprising the calculation circuit according to the configuration 19.

Configuration 21

A photoelectric conversion system comprising the photoelectric conversion device according to the configuration 1, and the calculation circuit according to the configuration 19.

Configuration 22

A photoelectric conversion system comprising the photoelectric conversion device according to the configuration 1, and a signal processing unit configured to generate an image using a signal output from the photoelectric conversion device.

Configuration 23

A moving body comprising the photoelectric conversion device according to the configuration 1, and a control unit configured to control a movement of the moving body using a signal output from the photoelectric conversion device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-145932, filed Sep. 8, 2021, No. 2022-018803, filed Feb. 9, 2022, and No. 2022-083065, filed May 20, 2022, which are hereby incorporated by reference herein in their entirety.

What is claimed is:

1. A photoelectric conversion device comprising:
    a photodiode configured to perform avalanche multiplication;
    a circuit provided between the photodiode and a power source, and configured to perform switching between a first state in which the photodiode is electrically connected with the power source and a second state in which the photodiode is not electrically connected with the power source;
    a counter configured to count an output signal output from the photodiode; and
    a memory into which time information indicating that a count value of the counter has reached a threshold value within a predetermined exposure period is written, the predetermined exposure period being included in an exposure period and shorter than the exposure period,
    wherein a clock signal is configured to be input to the circuit in the exposure period.

2. The photoelectric conversion device according to claim 1, wherein the predetermined exposure period includes a first exposure period and a second exposure period.

3. The photoelectric conversion device according to claim 2, wherein the first exposure period is shorter than the second exposure period, and the number of pulses of the clock signal in the first exposure period is equal to or greater than a maximum count value of the counter.

4. The photoelectric conversion device according to claim 2, wherein a length of the second exposure period is twice or more a length of the first exposure period.

5. The photoelectric conversion device according to claim 2, wherein the predetermined exposure period includes a third exposure period longer than the second exposure period, and a length of the third exposure period is twice or more a length of the second exposure period.

6. The photoelectric conversion device according to claim 2,
wherein the predetermined exposure period includes a third exposure period longer than the second exposure period,
wherein a length of the third exposure period is four or more times a length of the second exposure period, and
wherein the length of the second exposure period is four or more times a length of the first exposure period.

7. The photoelectric conversion device according to claim 2, wherein a first frequency that is an average frequency of the clock signal in the first exposure period and a second frequency that is an average frequency of the clock signal in the second exposure period are different from each other.

8. The photoelectric conversion device according to claim 7, wherein the first frequency is higher than the second frequency.

9. The photoelectric conversion device according to claim 2, wherein the number of pulses of the clock signal per unit time in the first exposure period is greater than that in the second exposure period.

10. The photoelectric conversion device according to claim 1, wherein the threshold value is a maximum count value of the counter.

11. The photoelectric conversion device according to claim 1, wherein the threshold value is less than a maximum count value of the counter.

12. The photoelectric conversion device according to claim 1, wherein the threshold value is a maximum count value of the counter/n, the n being a number of 2 or more.

13. The photoelectric conversion device according to claim 12,
wherein the predetermined exposure period includes a first exposure period and a second exposure period longer than the first exposure period, and
wherein the n is equal to or greater than a value of a length of the second exposure period/a length of the first exposure period.

14. The photoelectric conversion device according to claim 1, further comprising a control circuit configured to change, in a case where the counter has reached the threshold value within the predetermined exposure period, a potential to be supplied to a gate of a transistor included in the circuit.

15. The photoelectric conversion device according to claim 1, further comprising a control circuit configured to stop the counter, in a case where the counter has reached the threshold value within the predetermined exposure period.

16. The photoelectric conversion device according to claim 1, wherein the number of bits of the memory is less than that of the counter.

17. The photoelectric conversion device according to claim 1, further comprising a logic circuit between the photodiode and the counter,
wherein the clock signal is input to the logic circuit in the exposure period.

18. The photoelectric conversion device according to claim 1, wherein the clock signal has two or more different frequencies in the exposure period.

19. A calculation circuit configured to calculate a signal output from the photoelectric conversion device according to claim 1, wherein the calculation circuit changes a multiplication rate of the count value of the counter based on the time information.

20. The photoelectric conversion device according to claim 1, further comprising:
a calculation circuit configured to calculate a signal output from the photoelectric conversion device, wherein the calculation circuit changes a multiplication rate of the count value of the counter based on the time information.

21. A photoelectric conversion system comprising:
the photoelectric conversion device according to claim 1; and
a calculation circuit configured to calculate a signal output from the photoelectric conversion device, wherein the calculation circuit changes a multiplication rate of the count value of the counter based on the time information.

22. A photoelectric conversion system comprising:
the photoelectric conversion device according to claim 1; and
a signal processing unit configured to generate an image using a signal output from the photoelectric conversion device.

23. A moving body comprising:
the photoelectric conversion device according to claim 1; and
a control unit configured to control a movement of the moving body using a signal output from the photoelectric conversion device.

24. The photoelectric conversion device according to claim 1, wherein the clock signal is configured to be input to a gate of a transistor included in the circuit.

25. A photoelectric conversion device comprising:
a photodiode configured to perform avalanche multiplication;
a circuit provided between the photodiode and a power source, and configured to perform switching between a first state and a second state;
a counter configured to count an output signal output from the photodiode; and
a memory into which time information indicating that a count value of the counter has reached a threshold value within a predetermined exposure period is written, the predetermined exposure period being included in an exposure period and shorter than the exposure period,
wherein a clock signal is configured to be input to the circuit in the exposure period.

26. The photoelectric conversion device according to claim 25, wherein the clock signal is configured to be input to a gate of a transistor included in the circuit.

27. The photoelectric conversion device according to claim 26,
wherein the first state is a state in which the transistor is turned on and the photodiode is electrically connected with the power source, and
wherein the second state is a state in which the transistor is turned off.

* * * * *